(12) United States Patent
Huang et al.

(10) Patent No.: US 10,564,665 B2
(45) Date of Patent: Feb. 18, 2020

(54) PERFORMING SCALABLE, CAUSALLY CONSISTENT READS USING A LOGICAL WALL CLOCK

(71) Applicant: Microsoft Technology Licensing, LLC, Redmond, WA (US)

(72) Inventors: Cheng Huang, Bellevue, WA (US); Garret Buban, Redmond, WA (US); Jacob R. Lorch, Bellevue, WA (US); Aaron W. Ogus, Woodinville, WA (US); Mauricio David Zaragoza Ibarra, Redmond, WA (US); Jieqing Wang, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 99 days.

(21) Appl. No.: 15/968,482

(22) Filed: May 1, 2018

(65) Prior Publication Data
US 2019/0339734 A1 Nov. 7, 2019

(51) Int. Cl.
*G06F 1/12* (2006.01)
*G06F 1/08* (2006.01)

(52) U.S. Cl.
CPC . *G06F 1/12* (2013.01); *G06F 1/08* (2013.01)

(58) Field of Classification Search
CPC .................................. G06F 1/12; H04J 3/0638
See application file for complete search history.

(56) References Cited

U.S. PATENT DOCUMENTS

| 5,713,017 | A | 1/1998 | Lin et al. |
| 8,756,343 | B2 | 6/2014 | Kobashi |
| 9,568,943 | B1 | 2/2017 | Carman |
| 2004/0205372 | A1* | 10/2004 | Moser ................. G06F 11/1683 714/1 |
| 2015/0295700 | A1* | 10/2015 | Gomez Gutierrez ..... G06F 1/14 375/354 |

OTHER PUBLICATIONS

"International Search Report and Written Opinion Issued in PCT Application No. PCT/US2019/027571", dated Jul. 11, 2019, 11 Pages.

* cited by examiner

*Primary Examiner* — Albert Wang
(74) *Attorney, Agent, or Firm* — Fiala & Weaver P.L.L.C.

(57) ABSTRACT

A first set of replicated state machines includes a first state machine that compares a clock value included in a state update message incremented by a first amount, a clock value for the first state machine incremented by a second amount, and a current local wall clock value for the first state machine to determine a maximum value and assigns the maximum value as the clock value for the first state machine. Additionally, in response to a passage of an amount of time, the first state machine advances the clock value for the first state machine to its current local wall clock value and propagates this clock value to the other state machines in the first set of replicated state machines. The advancement of the clock value for all state machines even in the absence of state updates improves their ability to respond to distributed read requests.

20 Claims, 9 Drawing Sheets

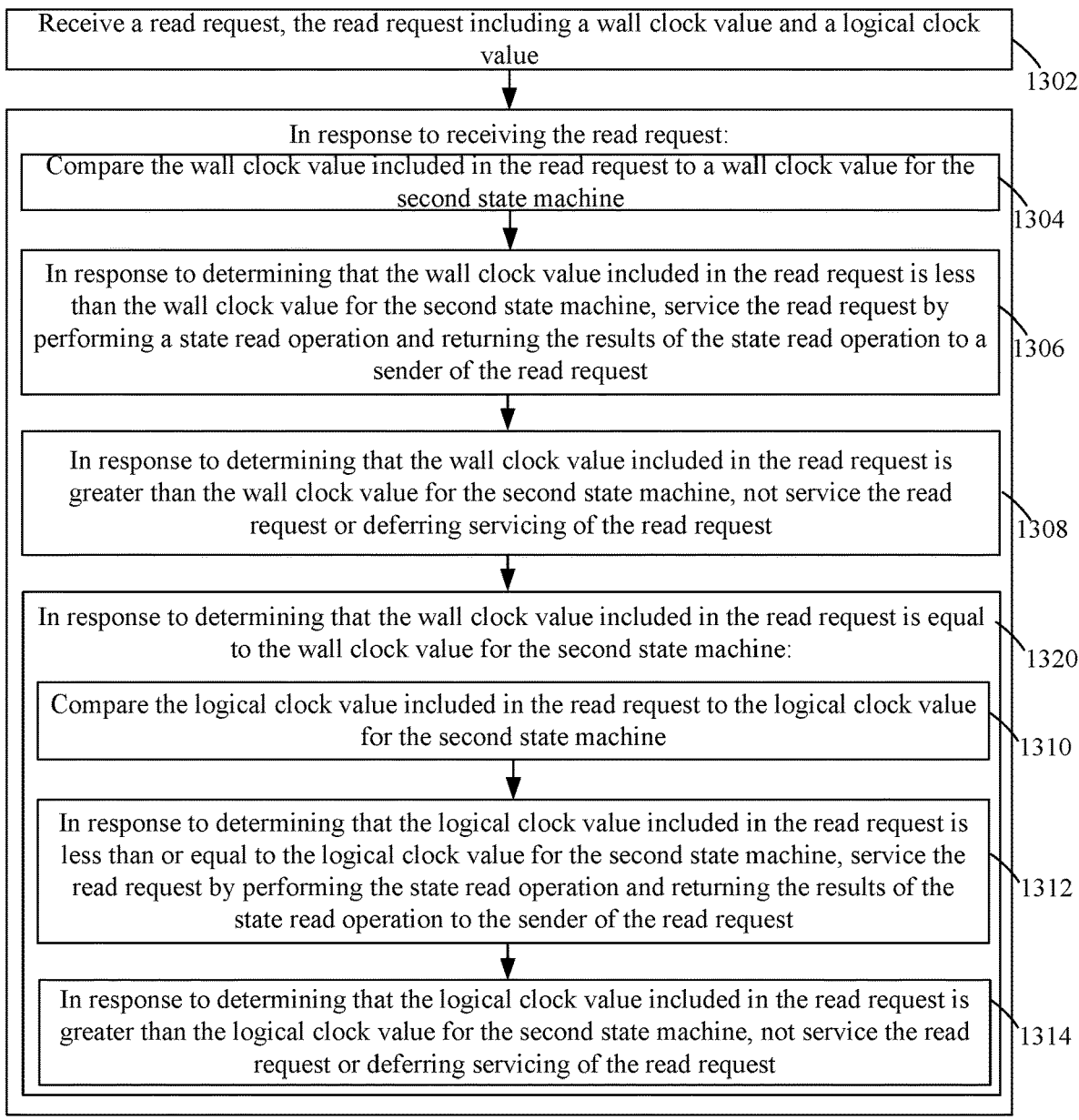

PERFORMING SCALABLE, CAUSALLY CONSISTENT READS USING A LOGICAL WALL CLOCK

BACKGROUND

In computing, computer systems may be made fault tolerant through replication. An approach to replication used in distributed systems is state machine replication. State machine replication involves replicating servers and coordinating client interactions with server replicas. For example, multiple state machines can form a set of replicated state machines (e.g., in some implementations, a replicated state library ("RSL") ring) and propagate state updates amongst the state machines that are within the replicated state machine set (e.g., by employing the well-known Paxos algorithm or some other suitable algorithm for implementing a fault-tolerant distributed system). One state machine of the replicated state machine set may be selected as the primary state machine, and all state updates will be executed by the primary state machine and then propagated to the remaining state machines of the replicated state machine set. The remaining state machines of the replicated state machine set may be referred to as secondary state machines. In some implementations, a secondary state machine can implement the state update even if only a subset (e.g., a quorum) of the secondary state machines acknowledges the state update. Consequently, some of the secondary state machines of the replicated state machine set may be behind or out of date with respect to the other state machines.

Read requests for state data may be routed directly to and satisfied by secondary state machines of the replicated state machine set. This feature may be referred to as distributed reads. In some conventional implementations, distributed reads are implemented by having each client and state machine in the replicated state machine set maintain its own sequence number, wherein the sequence number is indicative of the most recent state of which that machine is aware. When a client sends a read request to the replicated state machine set, the client embeds in the read request the highest sequence number that the client has encountered. When a secondary state machine receives the read request, it will then compare its sequence number to the sequence number embedded in the read request. The secondary state machine services the read request only if its own sequence number is at least as high as the one in the read request, since in this case the secondary state machine is maintaining a state that is not behind (i.e., lagging) the state observed by the client. Otherwise, the secondary state machine redirects the request to the primary state machine.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer program products are described herein that facilitate the performance of scalable, causally consistent distributed reads. In an embodiment, a first set of replicated state machines includes a first state machine. The first state machine compares a clock value included in a state update message incremented by a first amount, a clock value for the first state machine incremented by a second amount, and a current local wall clock value for the first state machine to determine a maximum value thereof and assigns the maximum value as the clock value for the first state machine. The first state machine also performs a state update requested by the state update message and propagates the state update and the clock value for the first state machine to the other state machines in the first set of replicated state machines and transmits the clock value for the first state machine to a sender of the state update message.

Additionally, in response to a passage of an amount of time, the first state machine advances the clock value for the first state machine to the current local wall clock value for the first state machine and propagates the clock value for the first state machine to the other state machines in the first set of replicated state machines. The advancement of the clock value for all state machines even in the absence of state updates improves the ability of the replicated state machines to respond to distributed read requests.

In alternate embodiments, a similar approach is taken except that instead of maintaining a single clock value, each state machine in the first set of replicated state machines maintains both a wall clock value and a logical clock value.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the application and, together with the description, further serve to explain the principles of the embodiments and to enable a person skilled in the relevant art(s) to make and use the embodiments.

FIG. 12 depicts a flowchart of a method for advancing a wall clock value and resetting a logical clock value for a first state machine and propagating the wall clock value and the logical clock value for the first state machine to other state machines, in accordance with an embodiment.

FIG. 13 depicts a flowchart of a method for determining whether a secondary state machine can service a read request, in accordance with an embodiment.

Figure 1:
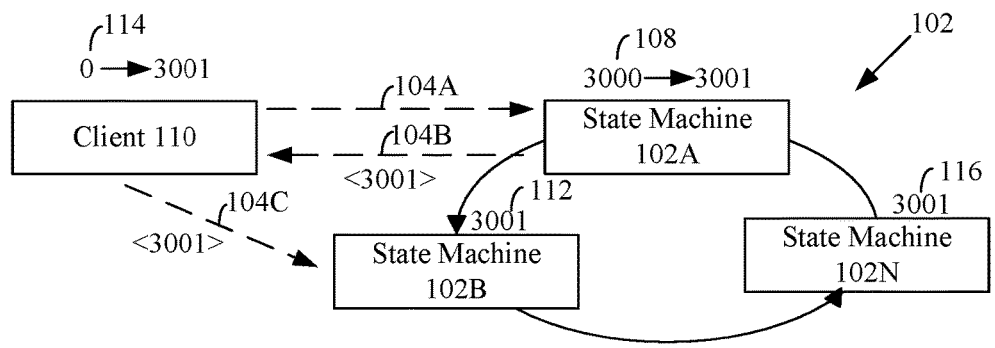
FIG. 1 is a block diagram of an example set of replicated state machines implementing a state update and a distributed read in a conventional manner.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

In the discussion, unless otherwise stated, adjectives such as "substantially," "approximately," and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

In computing, computer systems may be made fault tolerant through replication. An approach to replication used in distributed systems is state machine replication. State machine replication involves replicating servers and coordinating client interactions with these server replicas. For example, multiple state machines can form a set of replicated state machines (e.g., in some implementations, a replicated state library ("RSL") ring) and propagate state updates amongst the state machines that are within the replicated state machine set (e.g., by employing the well-known Paxos algorithm or some other suitable algorithm for implementing a fault-tolerant distributed system). One state machine of the replication state machine set may be selected as the primary state machine, and all state updates will be executed by the primary state machine and then propagated to the remaining state machines of the replicated state machine set. The remaining state machines of the replication state machine set may be referred to as secondary state machines. In some implementations, a secondary state machine can implement the state update even if only a subset (e.g., a quorum) of the secondary state machines acknowledges the state update. Consequently, some of the secondary state machines of the replicated state machine set may be behind or out of date with respect to the other state machines.

Read requests for state data may be routed directly to and satisfied by the secondary state machines of the replicated state machine set. This feature may be referred to as distributed reads. In some conventional implementations, distributed reads are implemented by having each client and state machine in the replicated state machine set maintain its own sequence number, wherein the sequence number is indicative of the most recent state of which that machine is aware. When a client sends a read request to the replicated state machine set, the client embeds in the read request the highest sequence number that the client has encountered. When a secondary state machine receives the read request, it will then compare its sequence number to the sequence number embedded in the read request. The secondary state machine services the read request only if its own sequence number is at least as high as the one in the read request, since in this case the secondary state machine is maintaining a state that is not behind (i.e., lagging) the state observed by the client (e.g., due to delays in propagating state updates from the primary state machine within the replicated state machine set). Otherwise, the secondary state machine redirects the request to the primary state machine.

In addition, when a state machine sends the client a response to a read or write request, the state machine also embeds the highest sequence number that it has encountered in the response. The client compares the sequence number in the response to its own and updates its sequence number if the sequence number in the response is higher. Likewise, when two clients communicate with each other, the source client embeds its sequence number in a message, and the destination client updates its own sequence number when receiving one that is higher.

By diverting reads to secondary state machines, a load on the primary state machine is reduced, thereby improving overall state machine response time. Further, if the primary state machine holds an exclusive lock on the state data, a distributed read allows state data to be read continuously when served by secondary state machines.

To help depict the foregoing, FIG. 1 is described. In particular, FIG. 1 is a block diagram of an example set of replicated state machines implementing a state update and a distributed read in a conventional manner. As shown in FIG. 1, a system 100 includes a client 110 and a replicated state machine set 102. System 100 is described in further detail as follows.

In FIG. 1, state machine 102A, state machine 102B, and state machine 102N form replicated state machine set 102 and are communicatively connected in a ring configuration. Replicated state machine set 102, however, may include any number of state machines and such state machines may be communicatively connected in any suitable configuration. Replicated state machine set 102 is configured to select a primary state machine from amongst state machines 102A, 102B, and 102N and to replicate a state update that is executed by the primary state machine among the remaining state machines. Furthermore, each state machine of replicated state machine set 102 is configured to maintain its own sequence number. The sequence number is a monotonically increasing value that is indicative of an order in which state updates are executed at particular state machines.

To help illustrate, assume that state machine 102A has been selected as a primary state machine, and state machines 102B and 102N are selected as secondary state machines. As the primary state machine, state machine 102A is configured to receive all state update messages. For example, as shown in FIG. 1, state machine 102A receives a state update message 104A from client 110. With continued reference to FIG. 1, in response to receiving state update message 104A from client 110, state machine 102A executes a state update operation associated with state update message 104A and increments a sequence number 108 at state machine 102A by an amount after completing the state update operation. For example, as shown in FIG. 1, after executing the state update operation, state machine 102A increments sequence number 108 associated with state machine 102A by one, from a value of 3000 to 3001.

State machine 102A is further configured to propagate the state update and its updated sequence number to the other state machines in replicated state machine set 102. In response to receiving the state update associated with state update message 104A and the updated sequence number value of 3001 from state machine 102A, state machine 102B executes the state update operation and updates its own sequence number 112 to a value of 3001. Similarly, in response to receiving the state update associated with state update message 104A and the updated sequence number value of 3001 from state machine 102A, state machine 102N executes the state update operation and updates its own sequence number 116 to a value of 3001.

As primary state machine, state machine 102A is additionally configured to send an acknowledgement that a state update operation is complete to clients requesting the state update. For example, as shown in FIG. 1, after completing the requested state update associated with state update message 104A, state machine 102A sends client 110 a message 104B that includes acknowledgement of completion of the state update associated with state update message 104A and its updated sequence number 108 value of 3001. Client 110 subsequently updates its own sequence number 114 to a value of 3001 because the value of sequence number 108 is the highest sequence number value that client 110 has encountered. In embodiments, message 104B may be sent to client 110 from state machine 102A before, during, or after state machine 102A has propagated the state update and the updated value of sequence number 108 to state machines 102B and 102N.

Replicated state machine set 102 is further configured to perform a distributed read. For example, as shown in FIG. 1, after receiving message 104B and updating its sequence number 114, client 110 sends a read request 104C to secondary state machine 102B. Client 110 embeds in read request 104C its sequence number 114 which has a value of 3001. Next, when secondary state machine 102B receives read request 104C, state machine 102B compares a value of its sequence number 112 at state machine 102B to the value of the sequence number embedded in read request 104C. Because the value of sequence number 112 (a value of 3001) is at least as high as the sequence number value included in read request 104C (a value of 3001), state machine 102B services read request 104C by returning the requested state information.

However, the value of sequence number 112 associated with state machine 102B may also be less than the value of sequence number 114 included in read request 104C. For example, assume that state machine 102B has as its sequence number 112 a value of 3000 because the state update operation mentioned above has not yet propagated from state machine 102A to state machine 102B. In such a case, state machine 102B will not service read request 104C. Instead, it may redirect read request 104C to primary state machine 102B. Alternatively, state machine 102B may defer servicing the read request until such time as it executes a state update operation associated with sequence number 3001, or it may wait until a timeout occurs, at which point it may redirect read request 104C to primary state machine 102B.

Since each state machine in replicated state machine set 102 executes all state updates sequentially and does not service a read request if its sequence number value is lower than the sequence number value in a received read request, causal consistency of state data amongst the state machines 102A, 102B, 102N is ensured. That is, if operation A happened before B, any client observing B's effect is guaranteed to have observed A's effect.

Figure 2:
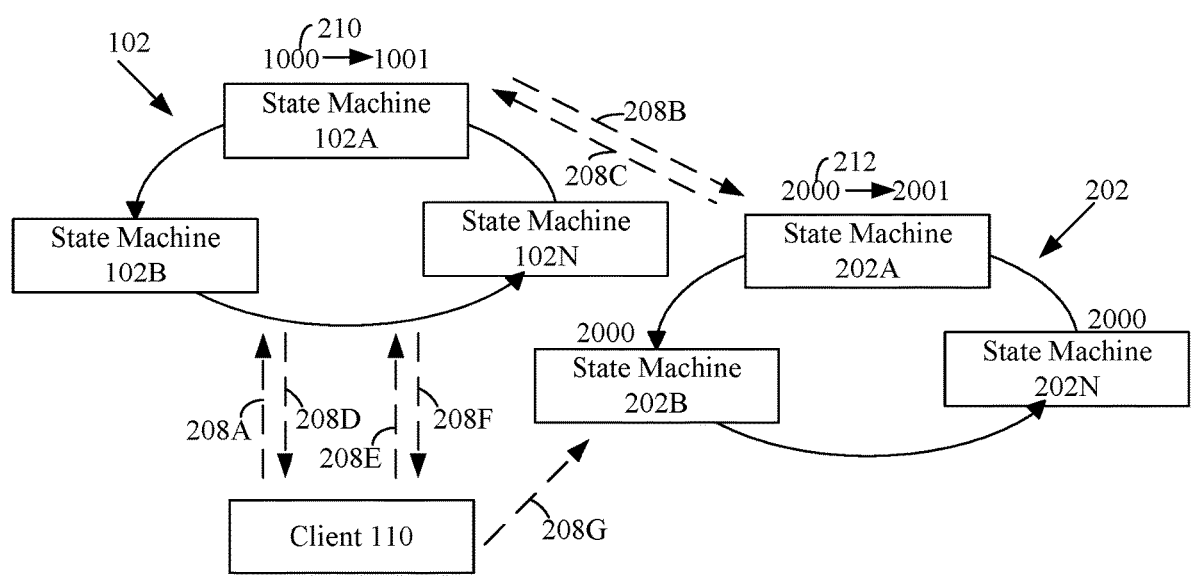
FIG. 2 is a block diagram that shows the performance of an operation that involves performing state updates across multiple sets of replicated state machines, and the performance of a distributed read.

However, the foregoing technique for ensuring causal consistency for distributed reads may not work in a system in which an operation may involve performing state updates across multiple sets of replicated state machines and imposes ordering constraints. This will now be explained in reference to FIG. 2. In particular, FIG. 2 is a block diagram that shows multiple sets of replicated state machines that execute such an operation, as well as a distributed read. As shown in FIG. 2, a system 200 includes client 110 and replicated state machine set 102 as described above in reference to FIG. 1, and a replicated state machine set 202. System 200 is described in further detail as follows.

As shown in FIG. 2, state machine 202A, state machine 202B, and state machine 202N form replicated state machine set 202 and are communicatively connected in a ring configuration. In this example, state machine 202A is selected as a primary state machine, while state machines 202B and 202N are selected as secondary state machines.

Replicated state machine set 202, however, may include any number of state machines and may be communicatively coupled in any configuration. Moreover, system 200 may include any number of replicated state machine sets.

Replicated state machine sets 102 and 202 are configured to send messages to each other to carry out certain operations that involve performing state updates at each set in a particular order. For example, to carry out such an operation, client 110 sends a state update message 208A to replicated state machine set 102, where it is received by primary state machine 102A. To carry out the state update requested by state update message 208A, primary state machine 102A must first send a state update message 208B to primary state machine 202A of replicated state machine set 202. In response to receiving state update message 208B, primary state machine 202A executes the state update associated with state update message 208B and then sends a message 208C acknowledging the same back to primary state machine 102A. In response to receiving message 208C, primary state machine 102A then executes its own state update operation, after which it sends a message 208D acknowledging completion of the state update operation associated with state update message 208A.

At some point after completion of the state update operations associated with state update messages 208A and 208B, client 110 sends a read request 208E to replicated state machine set 102, and in response to receiving read request 208E, replicated state machine set 102 sends a message 208F indicating that the requested state data may be retrieved from replicated state machine set 202. Consequently, client 110 sends a read request 208G to replicated state machine set 202.

To ensure consistency, it is crucial that secondary state machines of replicated state machine set 202 do not respond to read request 208G from client 110 before they have executed the state update operation associated with state update message 208B. Otherwise, client 110 may receive obsolete state data from replicated state machine set 202.

Implementing the approach described above with reference to FIG. 1 when performing a distributed read in a system such as that shown in FIG. 2 will not ensure consistency. To illustrate this, with continued reference to FIG. 2, before state update message 208A is sent, a sequence number 210 associated with primary state machine 102A has a value of 1000 and a sequence number 212 associated with primary state machine 202A has a value of 2000. As shown in FIG. 2, after executing the state update operation associated with state update message 208B, primary state machine 202A increases a value of its sequence number 212 from 2000 to 2001, and after executing the state update operation associated with state update message 208A, primary state machine 102A increases a value of sequence number 210 from 1000 to 1001.

Upon completion of the state update operation associated with state update message 208A, primary state machine 102A embeds the value of its sequence number 210 (i.e., 1001) in message 208F which is sent to client 110. This is the highest sequence number that client 110 has encountered, because client 110 has not yet interacted with replicated state machine set 202. Accordingly, client 110 embeds in read request 208G the value of sequence number 210 (i.e., 1001) and read request 208G is received by state machine 202B (a secondary state machine). State machine 202B can service read request 208G even before the state update operations associated with state update message 208B are executed at state machine 202B (as 2000>1001). Thus, there is no guarantee that state machine 202B has executed the state update operation, demonstrating that state machine 202B could return obsolete data to client 110 and thereby violate consistency.

Ergo, an approach to implementing distributed read requests in a system in which an operation may involve performing state updates across multiple sets of replicated state machines should achieve the following: consistency, by imposing order between operations whenever necessary; efficiency, by satisfying as many reads as possible from secondary state machines; and scalability, by keeping overhead small.

Figure 3:
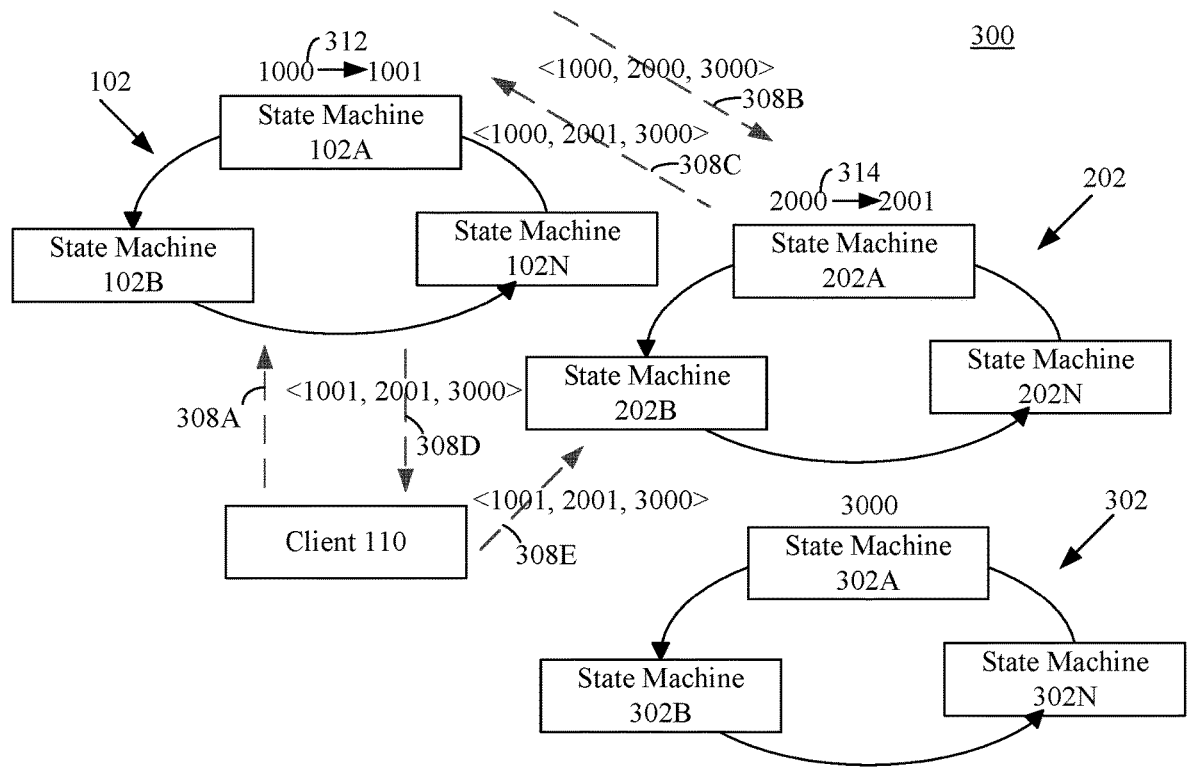
FIG. 3 is a block diagram of an example system that includes multiple sets of replicated state machines and that embeds a vector clock in system messages.

One approach that achieves consistency and efficiency but presents challenges with scalability is embedding a vector clock in messages, wherein the vector clock includes a different sequence number for each set of replicated state machines in a distributed system. A vector clock is a mechanism for generating a partial ordering of events in a distributed system and detecting causality violations. To help illustrate this, FIG. 3 is described. FIG. 3 is a block diagram of an example system that includes multiple sets of replicated state machines and that embeds a vector clock in system messages. Individual sequence numbers are maintained at state machines and clients in the same manner as described in FIG. 1 and FIG. 2. However, messages from each state machine and client now include a vector comprising a different sequence number for each set of replicated state machines in the system. System 300 is described in further detail as follows.

As shown in FIG. 3, a system 300 includes client 110 and replicated state machine set 102 as described above in reference to FIG. 1, replicated state machine set 202 as described above in reference to FIG. 2, and a replicated state machine set 302. Further, as shown in FIG. 3, state machine 302A, state machine 302B, and state machine 302N form replicated state machine set 302 and are communicatively coupled in a ring configuration. State machine 302A is a primary state machine, while the remaining state machines of replicated state machine set 302 are considered secondary state machines. Replicated state machine set 302, however, may include any number of state machines and may be communicatively coupled in any configuration. System 300 may include any number of state machine sets.

To further illustrate, in system 300 of FIG. 3, client 110 sends a state update message 308A to replicated state machine set 102, where it is received by primary state machine 102A. To carry out the state update requested by state update message 308A, primary state machine 102A must first send a state update message 308B to primary state machine 202A of replicated state machine set 202. Primary state machine 102A embeds a vector of sequence numbers in state update message 308B that includes not only the highest value of its own sequence number 312, but also the highest sequence numbers it has encountered for replicated state machine sets 202 and 302. Thus, the vector of sequence numbers embedded in state update message 308B is <1000, 2000, 3000>, wherein each value in the vector corresponds to one of replicated state machine sets 102, 202, and 302, respectively.

In response to receiving state update message 308B, primary state machine 202A executes the state update associated with state update message 308B. After executing the state update operation associated with state update message 308B, primary state machine 202A increments a value of its sequence number 314 from 2000 to 2001 and sends a message 308C back to primary state machine 102A. Message 308C acknowledges completion of the state update operation and includes the vector <1000, 2001, and 3000> which represents the highest sequence numbers that primary state machine 202A has encountered for replicated state machine sets 102, 202 and 302, respectively.

In response to receiving message 308C, primary state machine 102A then executes its own state update operation, increments a value of its sequence number 312 from 1000 to 1001, and sends a message 308D to client 110 acknowledging completion of the state update operation associated with state update message 308A. As shown in FIG. 3, the vector <1001, 2001, 3000> is embedded in message 308D and represents the highest sequence numbers that primary state machine 102A has encountered for replicated state machine sets 102, 202 and 302, respectively.

At some point after completion of the state update operations associated with state update messages 308A and 308B, client 110 sends a read request 308E to secondary state machine 202B of replicated state machine set 202. As depicted in FIG. 3, embedded in read request 308E is the vector <1001, 2001, 3000>, which represents the highest sequence numbers that client 110 has encountered for replicated state machine sets 102, 202 and 302, respectively. When secondary state machine 202B receives read request 308E, it compares a sequence number associated with secondary state machine 202B to the sequence number in the vector corresponding to replicated state machine set 202 and determines whether to service read request 308E itself or to redirect read request 308E to primary state machine 202A based on the result.

An approach implementing a vector clock such as that described above in reference to FIG. 3 achieves consistency because no secondary state machine will respond to a read request with obsolete data. In addition, an approach implementing a vector clock is efficient because secondary state machines can serve read requests during a distributed read. An approach implementing a vector clock, however, is not easily scalable. The size of the vector clock that must be included in each message (and therefore overhead) increases linearly as the number of state machine sets in a distributed system increases. This approach becomes infeasible as some distributed systems may include hundreds of sets of replicated state machines.

Another approach that achieves consistency but presents issues with efficiency is embedding a logical clock in messages in a distributed system. A logical clock represents a single counter that is maintained and updated at all state machines of a distributed system. For example, when a state machine transmits a message, the state machine includes in the message a highest value of a logical clock encountered at the state machine. A client also includes in its message a highest logical clock value that the client has encountered. When a state machine or client receives a message, it compares its own logical clock value to the value of the logical clock value embedded in the message. Each entity updates its local logical clock with the logical clock value embedded in the message if the logical clock value embedded in the message is higher than the value of its own logical clock.

Figure 4:
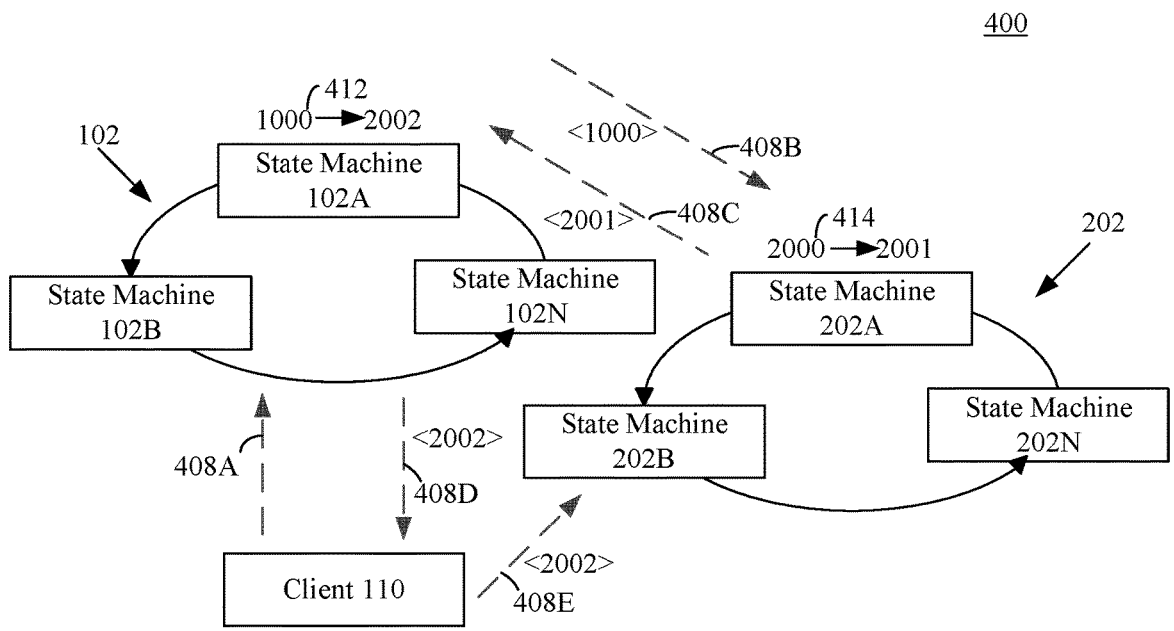
FIG. 4 is a block diagram of an example system that includes multiple sets of replicated state machines and that embeds a logical clock value in system messages.

To help demonstrate this approach, FIG. 4 is described. FIG. 4 is a block diagram of an example system that includes multiple sets of replicated state machines and that embeds a logical clock value in system messages. As shown in FIG. 4, a system 400 includes client 110 and replicated state machine set 102 as described above in reference to FIG. 1, and replicated state machine set 202 as described above in reference to FIG. 2. System 400 may include any number of state machine sets.

To further illustrate, in FIG. 4, client 110 sends a state update message 408A to replicated state machine set 102, where it is received by primary state machine 102A. To carry out the state update requested by state update message 408A, primary state machine 102A must first send a state update message 408B to primary state machine 202A of replicated state machine set 202. State machine 102A embeds a value of its own logical clock 412 in state update message 408B, which at this time is 1000.

After receiving state update message 408B, primary state machine 202A compares the logical clock value of 1000 embedded in state update message 408B to its own logical clock 414 value of 2000 and determines not to update the value of its own logical clock 414 since 2000 is greater than 1000. Also, in response to receiving state update message 408B, primary state machine 202A executes the state update associated with state update message 408B and increments the value of its logical clock 414 from 2000 to 2001. Primary state machine 202A then sends a message 408C acknowledging completion of the state update operation. As shown in FIG. 4, primary state machine 202A embeds the current value of its logical clock 416 in message 408C, which is 2001.

After receiving message 408C, primary state machine 102A compares the logical clock value of 2001 embedded in state update message 408B to its own logical clock 412 value of 1000 and updates the value of logical clock 412 to 2001, since 2001 is greater than 1000. Subsequently, primary state machine 102A executes the state update associated with state update message 408A and increments the value of its logical clock 412 from 2001 to 2002. Primary state machine 102A then sends a message 408D to client 110 acknowledging completion of the state update operation associated with state update message 408A. As indicated in FIG. 4, primary state machine 102A embeds in state update message 408D the current value of its logical clock 412, which is 2002.

In addition, in FIG. 4, after the state update operations associated with state update messages 408A and 408B are completed, client 110 sends a read request 408E to secondary state machine 202B of replicated state machine set 202. As shown in FIG. 4, client 110 embeds its own logical clock value of 2002 in read request 408E. After receiving read request 408E, secondary state machine 202B compares its own logical clock value to the logical clock value embedded in read request 408E and determines whether to service read request 408E itself. Secondary state machine 202B will only service the request if its own logical clock has a value of at least 2002. This ensures that state machine 202B has executed the state update associated with message 408B (corresponding to a logical clock value of 2001), thereby achieving consistency.

This, however, effectively disables the processing of read requests from the secondary state machines within replicated state machine set 202, even if all of those machines have executed the latest state update operation, since each of these machines will have a logical clock value of 2001, which is less than 2002. Secondary state machine 202B may wait until the logical clock value at state machine 202B is at least as high as 2002 before servicing read request 408E. Alternatively, state machine 202B may redirect the request to primary state machine 202A. This, however, impacts efficiency because the approach does not satisfy as many read requests as possible from secondary state machines.

The problem becomes more prominent when a set of replicated state machines processes state updates at a significantly different rate than other sets of replicated state machines in a distributed system, causing distributed read misses (e.g., 250 state update operations per second versus 50 state update operations per second). For example, a set of replicated state machines processing state update operations at a significantly slower rate than other sets of replicated state machines could cause distributed read misses in the set of replicated state machines. Alternatively, a set of replicated state machines processing state update operations at a significantly faster rate than other sets of replicated state machines could cause distributed read misses in the other sets of replicated state machines. That is, read requests will always have to wait or be redirected to a primary state machine.

Figure 5:
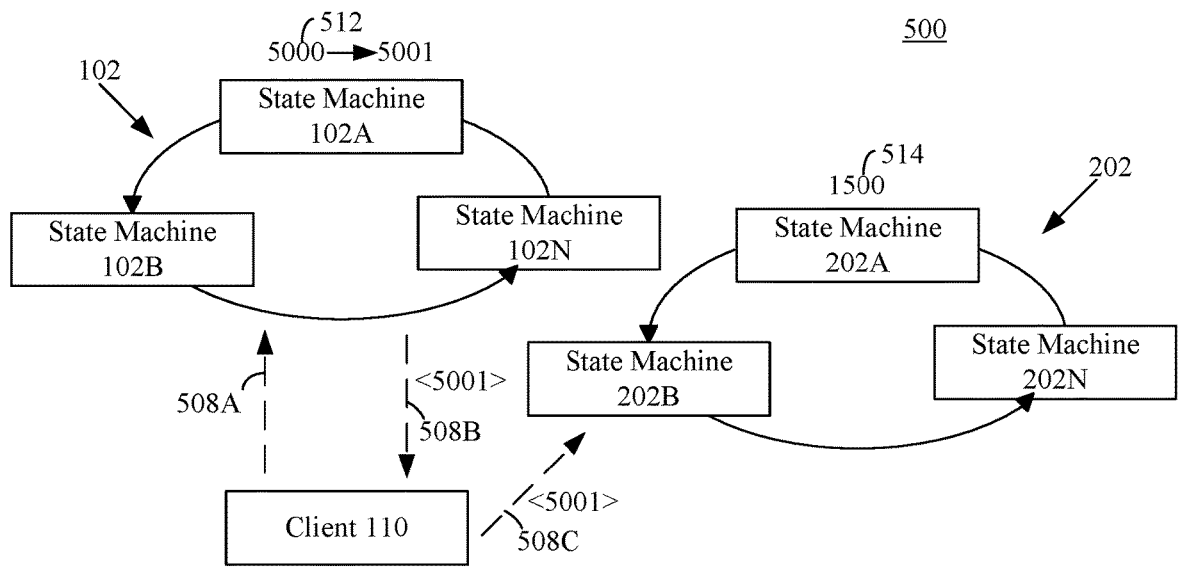
FIG. 5 is a block diagram of an example system that includes multiple sets of replicated state machines, each of which processes state updates at different rates.

To help illustrate this, FIG. 5 is described. In particular, FIG. 5 is a block diagram of an example system that includes multiple sets of replicated state machines, each of which processes state updates at different rates. As shown in FIG. 5, a system 500 includes client 110 and replicated state machine set 102 as described above in reference to FIG. 1, and replicated state machine set 202 as described above in reference to FIG. 2.

As further shown in FIG. 5, client 110 sends a state update message 508A to replicated state machine set 102, where it is received by primary state machine 102A. Subsequently, primary state machine 102A executes the state update associated with state update message 508A and increments the value of its logical clock 512 from 5000 to 5001 and sends a message 508B to client 110 acknowledging completion of the state update operation associated with state update messages 508A. As further shown in FIG. 5, primary state machine 102A embeds the value of its logical clock 512 (i.e., 5001) in state update message 508B.

After receiving message 508B, client 110 sends a read request 508C to secondary state machine 202B of replicated state machine set 202. As shown in FIG. 5, client 110 embeds its logical clock value of 5001 in read request 508C. After receiving read request 508C, secondary state machine 202B compares its logical clock value to the logical clock value embedded in read request 508C. In order to service read request 508C, secondary state machine 202B will have to wait until the logical clock value at secondary state machine 202B reaches 5001 from 1500 or redirect read request 508C to primary state machine 202A. However, if replicated state machine set 102 is performing state updates at a much faster rate than replicated state machine set 202, and client 110 is frequently interacting with replicated state machine set 102, then the secondary state machines in replicated state machine set 202 may rarely if ever have a logical clock value that is greater than or equal to the logical clock value observed by client 110. This means that the second state machines in replicated state machine set 202 may rarely if ever be able to handle distributed read requests from client 110. Therefore, while achieving causal consistency, a logical clock approach such as that described above may be inefficient if it leads to read requests not being satisfied by secondary state machines and unnecessarily redirected to a primary state machine.

Embodiments described herein implement an approach that satisfies efficiency, consistency, and scalability by combining a logical clock with a wall clock timestamp. Wall clock timestamps describe a record of actual time (e.g., 9:30:05 PM) of occurrence of a particular event (e.g., executing a state update operation) at a state machine. In accordance with this approach, adoption of concepts from the logical clock approach ensures consistency, while use of the wall clock timestamp achieves efficiency, and the use of a single clock value embedded in messages ensures scalability regardless of the total number of sets of replicated state machines in a distributed system.

The concepts adopted from the logical clock approach include a state machine or client embedding in messages transmitted from the state machine or client a highest clock value encountered at the state machine or client. In addition, when a state machine receives a state update message, it takes as its clock value the maximum of the following three values: the clock value included in the state update message incremented by a first amount, the state machine's own clock value incremented by a second amount, and a current local wall clock value for the state machine. When a client receives a message, it compares its clock value to a clock value embedded in the message and updates its local clock value with the clock value included in the message if the clock value included in the message is higher. In embodiments, the first amount and the second amount may be the same.

Another feature of the currently described approach involves a primary state machine being configured to advance a clock value at the primary state machine to the current local wall clock value for the primary state machine in response to a passage of an amount of time.

Figure 6:
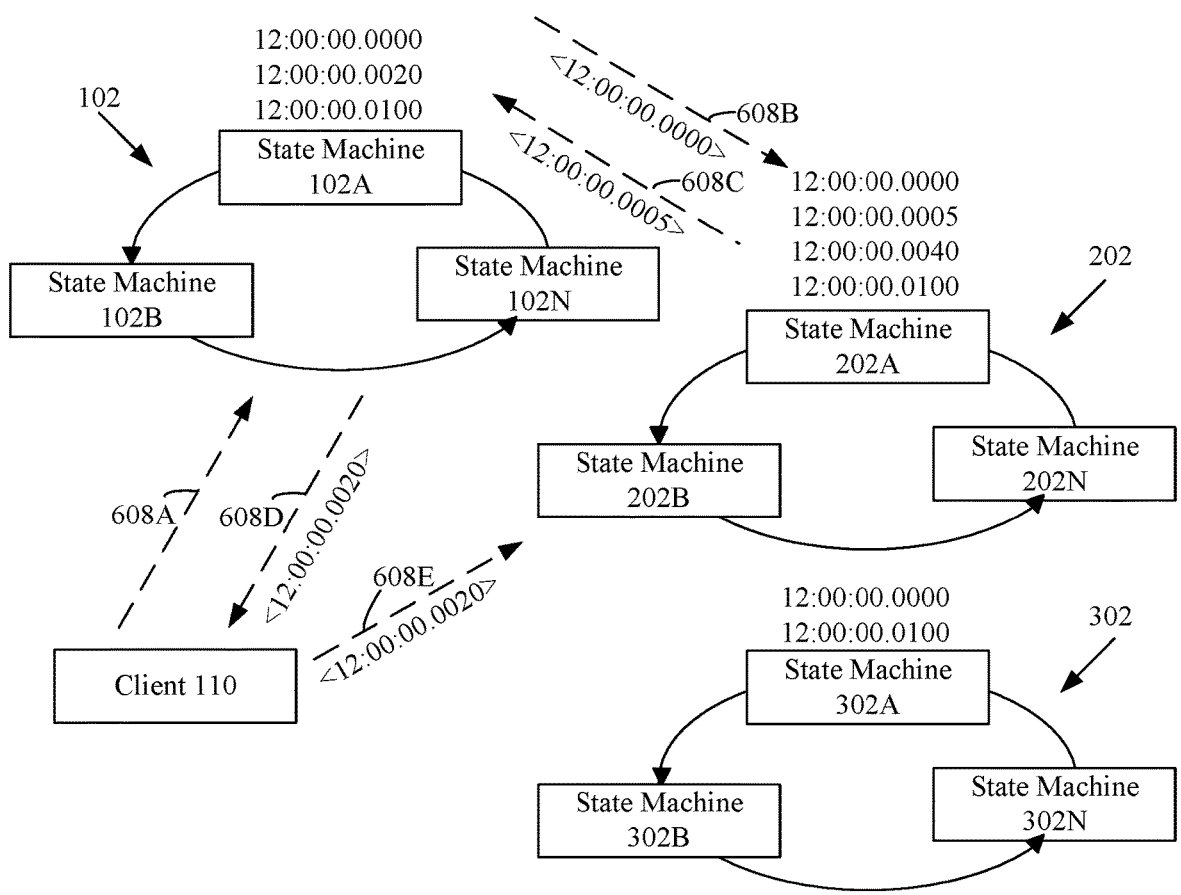
FIG. 6 is a block diagram of an example system in accordance with an embodiment that includes multiple sets of replicated state machines and that embeds a clock value in system messages, wherein the clock value may be advanced both in accordance with a logical clock scheme and based on the passage of wall clock time.

To help further illustrate the currently described approach, FIG. 6 is described. In particular, FIG. 6 is a block diagram of an example system in accordance with an embodiment that includes multiple sets of replicated state machines and that embeds a clock value in system messages, wherein the clock value may be advanced both in accordance with a logical clock scheme and based on the passage of wall clock time. As shown in FIG. 6, a system 600 includes a client 110 as described above in reference to FIG. 1, and replicated state machine sets 102, 202, and 302, as described above in reference to FIGS. 1, 2, and 3, respectively.

As further shown in FIG. 6, client 110 sends a state update message 608A to replicated state machine set 102, where it is received by primary state machine 102A. In this example, primary state machines 102A, 202A, and 302A each have wall clocks that are synchronized with each other and initially have a clock value of 12:00:00.0000. To carry out the state update requested by state update message 608A, primary state machine 102A must first send a state update message 608B to primary state machine 202A of replicated state machine set 202. Primary state machine 102A embeds its current clock value of 12:00:00.0000 in state update message 608B.

After receiving state update message 608B, primary state machine 202A executes the state update associated with state update message 608B, compares the clock value included in state update message 608B incremented by a first amount (e.g., incrementing a least significant digit of the clock value), its clock value incremented by a second amount, and a current local wall clock value for primary state machine 202A to determine a maximum value thereof, and updates its clock value with the maximum value. For instance, when wall clock time 612 is at 12:00:00.0005, primary state machine 202A updates its clock value from 12:00:00.0000 to 12:00:00.0005 after determining that its current local wall clock value (a value of 12:00:00.0005) is higher than the clock value included in state update message 608B incremented by a first amount of one nanosecond (to a value of 12:00:00.000000001) and its clock value incremented by a second amount of one nanosecond (a value of 12:00:00.000000001). In other embodiments, the first amount and the second amount may be different amounts. Primary state machine 202A then sends a message 608C to primary state machine 102A acknowledging completion of the state update operation. As shown in FIG. 6, primary state machine 202A includes its current clock value of 12:00:00.0005 in message 608C.

After receiving message 608C, primary state machine 102A executes the state update associated with state update message 608A, compares the clock value included in state update message 608C incremented by a first amount, its clock value incremented by a second amount, and a current local wall clock value for primary state machine 102A to determine a maximum value thereof, and updates its clock value with the maximum value. For instance, when wall clock time 612 is at 12:00:00.0020, primary state machine 102A updates its clock value from 12:00:00.0000 to 12:00:00.0020 after determining that its current local wall clock value (a value of 12:00:00.0020) is higher than the clock value included in state update message 608C incremented by a first amount of one nanosecond (to a value of 12:00:00.000500001) and its clock value incremented by a second amount of one nanosecond (to a value of 12:00:00.000000001). Primary state machine 102A then sends a message 608D to client 110 acknowledging completion of the state update operation associated with state update message 608A. As shown in FIG. 6, primary state machine 102A includes its clock value of 12:00:00.0020 in state update message 608D. Client 110 retains clock value 12:00:00.0020 because it is the largest clock value it has encountered.

As further demonstrated in in FIG. 6, at some point after receiving message 608D, client 110 sends a read request 608E to secondary state machine 202B of replicated state machine set 202. As shown in FIG. 6, client 110 includes its clock value of 12:00:00.0020 in read request 608E. After receiving read request 608E, state machine 202B compares the clock value at state machine 202B to the clock value included in read request 608E and determines that state machine 202B cannot service read request 608E. This is because the highest clock value possible at secondary state machine 202B is 12:00:00.0005—as nothing has occurred at replicated state machine set 202 to increase the clock value beyond 12:00:00.0005.

However, instead of redirecting read request to primary state machine 202A, state machine 202B may need to only wait a limited amount of time before being able to service read request 608E because primary state machine 202A automatically advances its clock value to its local wall clock value in response to a passage of an amount of time. To illustrate, as shown in FIG. 6, the clock value of primary state machine 202A is advanced to its local wall clock value with the passage of every 4 milliseconds (this may be referred to as a "heartbeat decree"). The current 4 millisecond period ends at 12:00:00.0040, at which time primary state machine 202A automatically advances its own clock value from 12:00:00.0005 to its local wall clock value of 12:00:00.0040. In accordance with this example, primary state machine 202A would advance its own clock value to its local wall clock value at 12:00:00.0400, 12:00:00.0800, and so forth. State machine 202A may propagate its updated clock value to secondary state machines 202B and 202N. When state machine 202B updates its clock value to 12:00:00.0040, state machine 202B can service read request 608E.

Moreover, all primary state machines 102A, 202A, and 302A may advance their clock values to match their local wall clock values after a passage of an amount of time to ensure all replicated state machine sets clock values are advancing. For example, as shown in FIG. 6, when wall clock time 612 is at 12:00:00.0100, clock values for primary state machines 102A, 202A, and 302A are all advanced to 12:00:00.0100.

Thus, by automatically advancing a clock value of a replicated state machine set based on the passage of an amount of time, the clock of even an inactive state machine set advances with clocks of other replicated state machines in the distributed system, thereby enabling secondary state machines of the inactive replicated state machine set to service read request from clients having communicated with the other replicated state machine sets that have executed state update operations.

Figure 7:
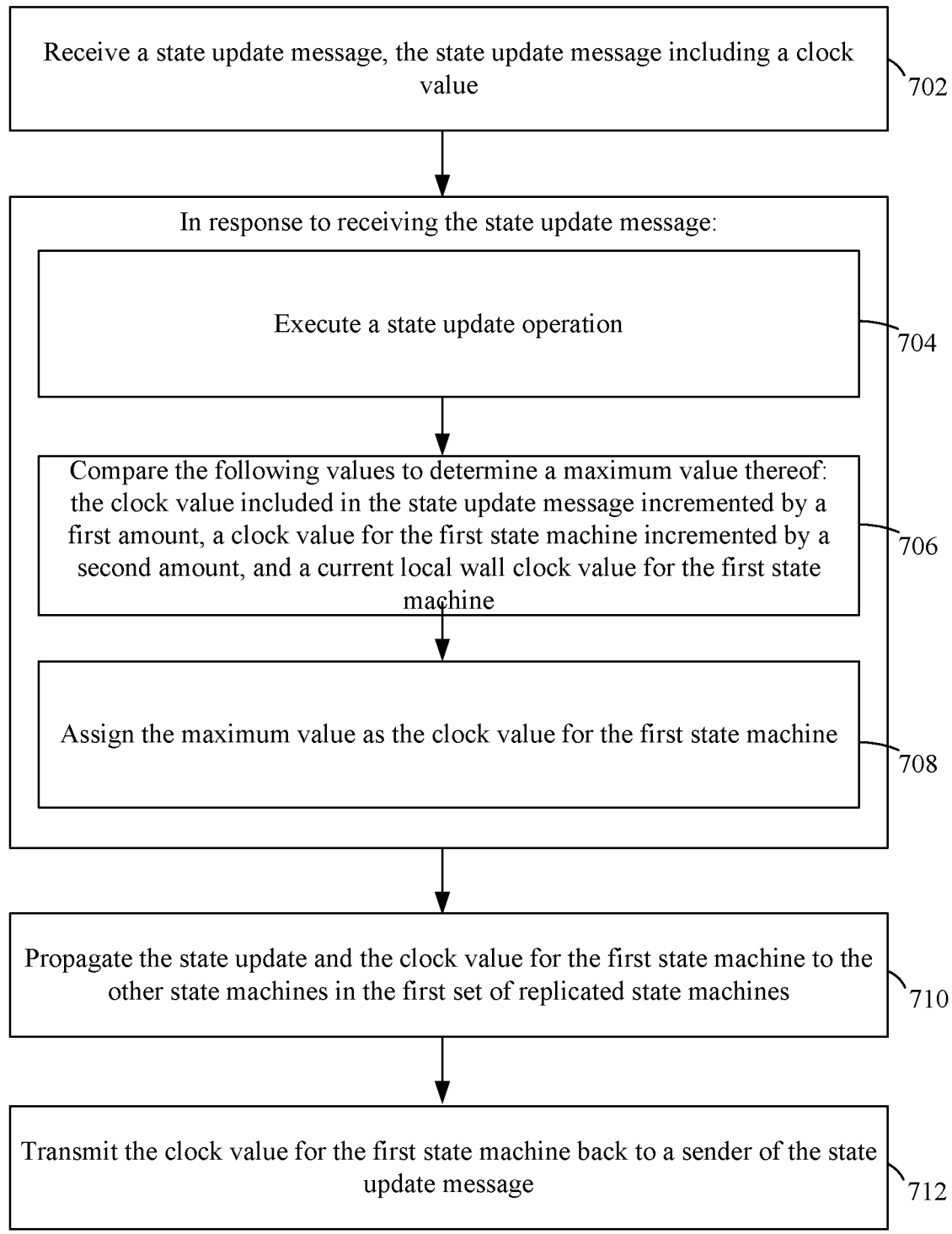
FIG. 7 depicts a flowchart of a method for receiving a state update message and obtaining a new clock value for a first state machine, in accordance with an embodiment.

System 600 may operate in various ways to perform its functions. For instance, FIG. 7 depicts a flowchart 700 of a method for receiving a state update message and obtaining a new clock value for a first state machine, according to an example embodiment. FIG. 7 is described with continued reference to FIG. 6. However, other structural and operational embodiments will be apparent to persons skilled in the relevant art(s) based on the following discussion regarding flowchart 700 and system 600 of FIG. 6.

As shown in FIG. 7, flowchart 700 begins at step 702. In step 702, a state update message that includes a clock value is received. For example, and with continued reference to FIG. 6, primary state machine 202A receives state update message 608B from primary state machine 102A including clock value 12:00:00.0000. In another embodiment, a state machine may receive a state update message from a client. For example, and with continued reference to FIG. 6, primary state machine 102A receives state update message 608A from client 110.

In response to receiving the state update message, steps 704, 706 and 708 are performed. At step 704, a state update operation is executed. At step 706, the following values are compared to determine a maximum value thereof: the clock value included in the state update message incremented by a first amount, a clock value for the first state machine incremented by a second amount, and a current local wall clock value for the first state machine. At step 708, the maximum value is assigned as the clock value for the first state machine. For example, and with continued reference to FIG. 6, after receiving state update message 608B, primary state machine 202A executes the state update associated with state update message 608B, compares the clock value included in state update message 608B incremented by a first amount, its clock value incremented by a second amount, and a current local wall clock value for primary state machine 202A to determine a maximum value thereof, and updates its clock value with the maximum value. To further illustrate, when wall clock time 612 is at 12:00:00.0005, primary state machine 202A updates its clock value from 12:00:00.0000 to 12:00:00.0005 after determining that its current local wall clock value (a value of 12:00:00.0005) is higher than the clock value included in state update message 608B incremented by a first amount of one nanosecond (a value of 12:00:00.000000001) and its clock value incremented by a second amount of one nanosecond (a value of 12:00:00.000000001). In other embodiments, the first amount and the second amount may be different.

In step 710, the state update and the clock value for the first state machine may be propagated to the other state machines in the first set of replicated state machines. For example, and with continued reference to FIG. 6 and the foregoing example described above, state machine 202A may propagate the state update associated with state update message 608B and its updated clock value (a value of 12:00:00.0005) to the other state machines in replicated state machine set 202. For instance, in response to receiving the state update associated with state update message 608B and the updated clock value from primary state machine 202A, secondary state machine 202B executes the state update operation and updates its clock value to 12:00:00.0005. Similarly, in response to receiving the state update associated with state update message 608B and the updated clock value from primary state machine 202A, secondary state machine 202N executes the state update operation and updates its clock value to 12:00:00.0005.

In step 712, the clock value for the first state machine is transmitted back to a sender of the state update message. For example, and with continued reference to FIG. 6, primary state machine 202A then sends a message 608C to primary state machine 102A acknowledging completion of the state update operation. As shown in FIG. 6, primary state machine 202A includes its current clock value of 12:00:00.0005 in message 608C.

Figure 8:
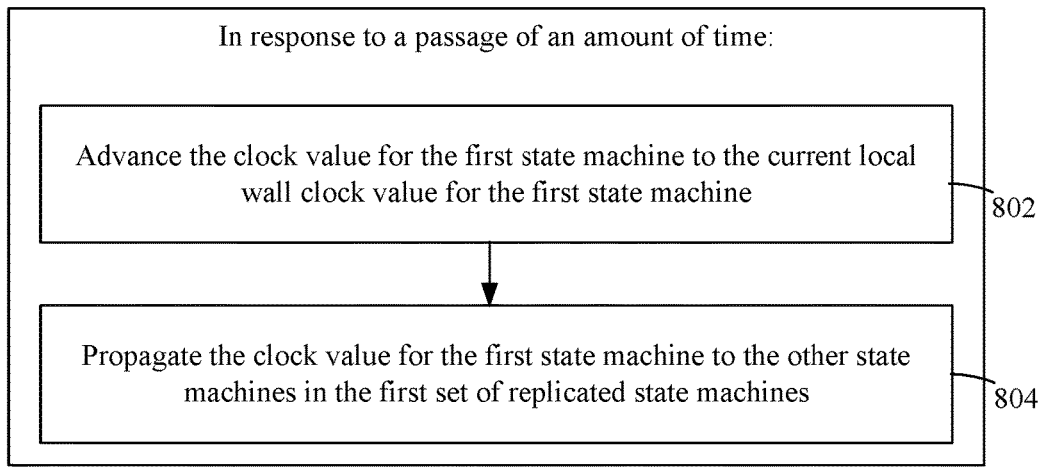
FIG. 8 depicts a flowchart of a method for advancing a clock value for a first state machine and propagating the clock value for the first state machine to other state machines, in accordance with an embodiment.

Another example of how system 600 may operate to perform its functions is depicted in FIG. 8. In particular, FIG. 8 depicts a flowchart 800 of a method for advancing a clock value for a state machine and propagating the clock value for the first state machine to other state machines, according to an example embodiment. FIG. 8 is described with continued reference to FIG. 6. However, other structural and operational embodiments will be apparent to persons skilled in the relevant art(s) based on the following discussion regarding flowchart 800 and system 600 of FIG. 6.

As shown in FIG. 8, flowchart 800 begins at step 802. In step 802, in response to a passage of an amount of time, the clock value for the first state machine is advanced to the current local wall clock value for the first state machine. For example, and with continued reference to FIG. 6, the clock value of primary state machine 202A is advanced to its local wall clock value with the passage of every 4 milliseconds. The current 4 millisecond period ends at 12:00:00.0040, at which time primary state machine 202A automatically advances its own clock value from 12:00:00.0005 to its local wall clock value of 12:00:00.0040. In accordance with this example, primary state machine 202A would advance its own clock value to its local wall clock value at 12:00:00.0400, 12:00:00.0800, and so forth.

In step 804, in further response to a passage of an amount of time, the clock value for the first state machine is propagated to the other state machines in the first set of replicated state machines. For example, and with continued reference to FIG. 6, after the clock value for state machine 202A is advanced, primary state machine 202A may propagate its updated clock value to secondary state machines 202B and 202N.

Figure 9:
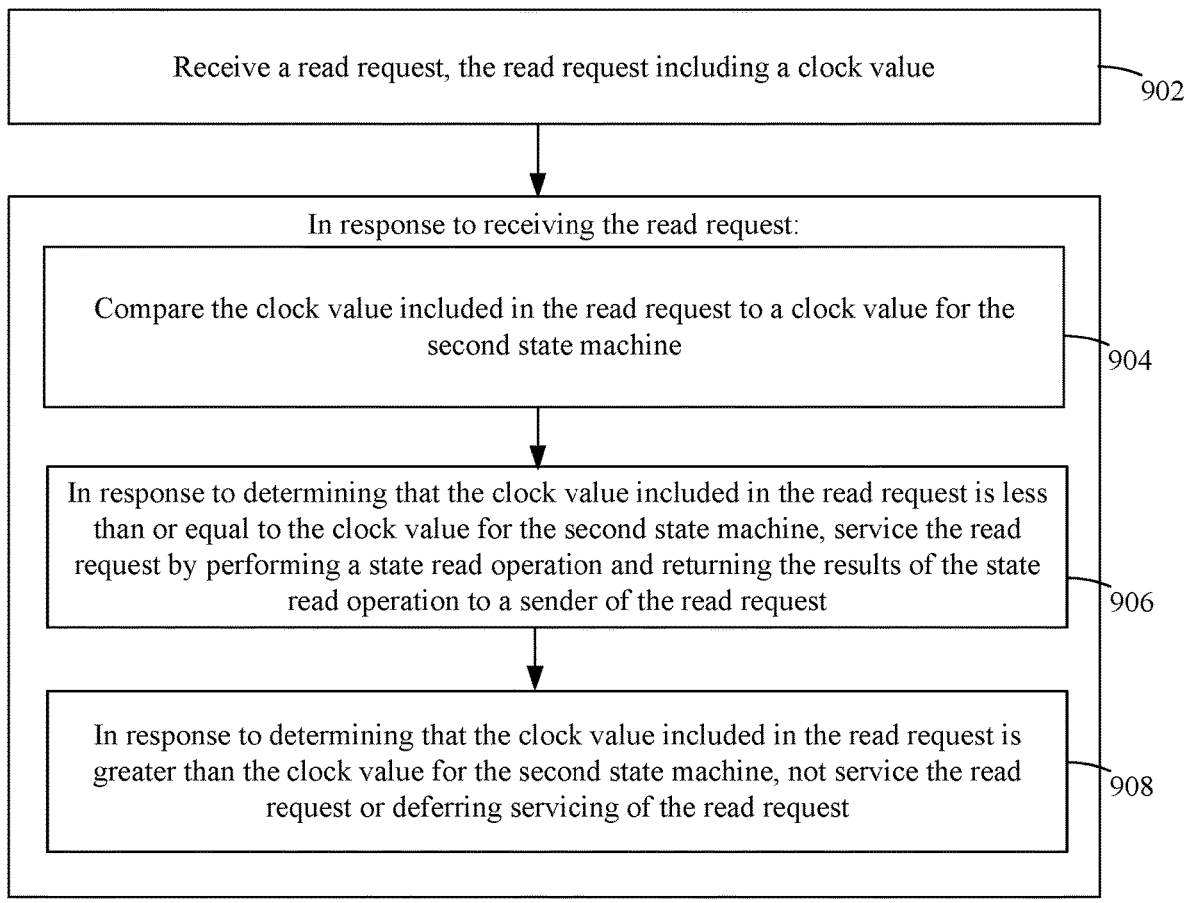
FIG. 9 depicts a flowchart of a method for determining whether a secondary state machine can service a read request, in accordance with an embodiment.

Yet another example of how system 600 may operate to perform its functions is depicted in FIG. 9. In particular, FIG. 9 depicts a flowchart 900 of a method for determining whether a secondary state machine can service a read request, according to an example embodiment. FIG. 9 is described with continued reference to FIG. 6. However, other structural and operational embodiments will be apparent to persons skilled in the relevant art(s) based on the following discussion regarding flowchart 900 and system 600 of FIG. 6.

As shown in FIG. 9, flowchart 900 begins at step 902. In step 902, a read request that includes a clock value is received. For example, and with continued reference to FIG. 6, secondary state machine 202B may receive read request 608E from client 110.

In step 904, in response to receiving the read request, the clock value included in the read request is compared to a clock value for the second state machine. For example, and with continued reference to FIG. 6, after receiving read request 608E, secondary state machine 202B may compare a clock value at secondary state machine 202B to a clock value included in read request 608E. As shown in FIG. 6, client 110 includes its clock value of 12:00:00.0020 in read request 608E. After receiving read request 608E, state machine 202B compares the clock value at state machine 202B to the clock value included in read request 608E.

In step 906, in response to determining that the clock value included in the read request is less than or equal to the clock value for the second state machine, the read request is serviced by performing a state read operation and returning the results of the state read operation to a sender of the read request. For example, and with continued reference to FIG. 6, assuming that the clock value of primary state machine 202A has advanced to 12:00:00.0040 after the execution of a heartbeat decree and primary state machine 202A has propagated its updated clock value to secondary state machine 202B, secondary state machine 202B may service read request 608E and return the results to client 110 because the clock value of 12:00:00.0020 embedded in read request 608E is less than the clock value of 12:00:00.0040 at secondary state machine 202B.

Alternatively, in step 908, in response to determining that the clock value included in the read request is greater than the clock value for the second state machine, the read request is not serviced or the read request is deferred. For example, with continued reference to FIG. 6, assuming that primary state machine 202A has not executed a heartbeat decree and thus has not advanced its clock value to 12:00:00.0040, secondary state machine 202B may not service read request 608E or may defer read request 608E to primary state machine 202A because the clock value of 12:00:00.0020 embedded in read request 608E is greater than the clock value of at most 12:00:00.0005 at secondary state machine 202B.

In another embodiment, the approach described above may be implemented by utilizing a vector rather than a single clock value, wherein the vector includes two components: a wall clock value (e.g., a timestamp) and a logical clock value. For example, in accordance with such an embodiment, after a primary state machine of a state machine set receives a message, the primary state machine may compare its wall clock value to the wall clock value included in the received message. If the wall clock value of the primary state machine is less than the wall clock value in the message, then the primary state machine updates its wall clock value with the wall clock value received in the message and resets its logical clock. If the wall clock value of the primary state machine is greater than the wall clock value in the message, then the primary state machine keeps its wall clock value but increases its logical clock value by an amount.

If the wall clock value of the primary state machine is equal to the wall clock value in the message, then the primary state machine compares its logical clock value to the logical clock value included in the message. If the logical value of the primary state machine is less than the logical value in the message, then the primary state machine replaces its logical clock with the logical clock in the message incremented by the amount. Otherwise, the primary state machine increases its own logical clock by the amount.

In further accordance with this embodiment, the replicated state machine set may also advance its wall clock value to the current wall clock time periodically (e.g., every ten milliseconds) even in the absence of state updates (e.g., by executing a no-op operation). At the time the wall clock value is advanced, the logical clock value is reset.

Figure 10:
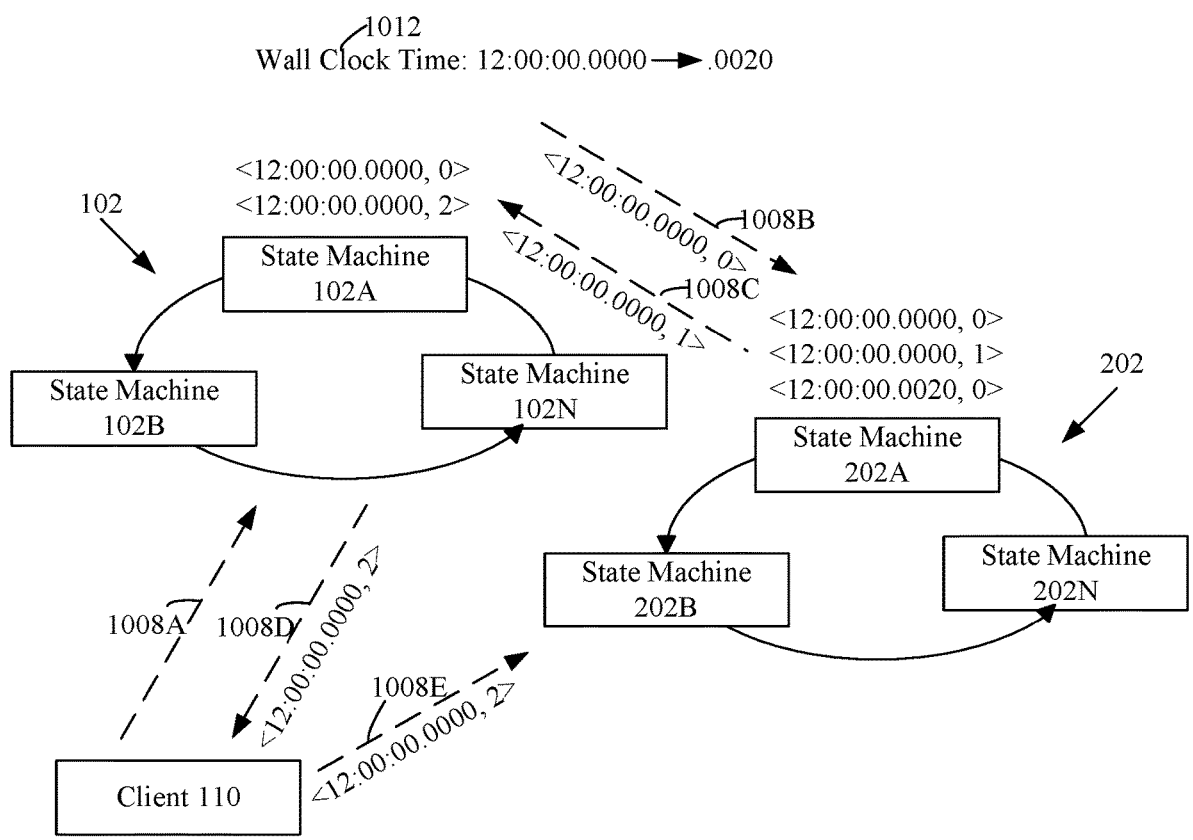
FIG. 10 is a block diagram of an example system in accordance with an embodiment that includes multiple sets of replicated state machines and that embeds a vector in system messages, wherein the vector includes a wall clock value and a logical clock value.

To expound on the above embodiment, FIG. 10 will be described. In particular, FIG. 10 is a block diagram of an example system in accordance with an embodiment that includes multiple sets of replicated state machines and that embeds in system messages a vector comprising a wall clock value and a logical clock value. As shown in FIG. 10, a system 1000 includes a client 110 as described above in reference to FIG. 1, and replicated state machine sets 102 and 202, as described above in reference to FIGS. 1 and 2, respectively.

As further shown in FIG. 10, client 110 sends a state update message 1008A to replicated state machine set 102, where it is received by primary state machine 102A. In this example, primary state machines 102A and 202A each have wall clocks that are synchronized with each other and initially have a wall clock value of 12:00:00.0000 and a logical clock value of 0. To carry out the state update requested by state update message 1008A, primary state machine 102A must first send a state update message 1008B to primary state machine 202A of replicated state machine set 202. Primary state machine 102A embeds its current wall clock value of 12:00:00.0000 and its logical clock value of 0 in state update message 1008B.

After receiving state update message 1008B, primary state machine 202A executes the state update associated with state update message 1008B and compares the wall clock value included in state update message 1008B to its wall clock value. For instance, after determining that the wall clock value included in state update message 1008B is equal to the wall clock value for primary state machine 202A (as both wall clock values are 12:00:00.0000), primary state machine 202A compares the logical clock value included in state update message 1008B to the logical clock value for state machine 202A. Because the logical clock value included in state update message 1008B is not greater than the logical clock value for the primary state machine 202A (as both logical clock values are 0), primary state machine 202A increments its logical clock value by a first amount. For example, as shown in FIG. 10, primary state machine 202A increments its logical clock by one from 0 to 1. Primary state machine 202A then sends a message 1008C to primary state machine 102A acknowledging completion of the state update operation. As shown in FIG. 10, primary state machine 202A includes its current wall clock value of 12:00:00.0000 and its logical clock value of 1 in message 1008C.

After receiving message 1008C, primary state machine 102A executes the state update associated with state update message 1008A and compares the wall clock value included in state update message 1008C to its wall clock value. For instance, after determining that the wall clock value included in state update message 1008C is equal to the wall clock value for primary state machine 102A (as both wall clock values are 12:00:00.0000), primary state machine 102A compares the logical clock value included in state update message 1008C to its logical clock value. Because the logical clock value included in state update message 1008C (a value of 1) is greater than the logical clock value (value of 0) for the primary state machine 102A, primary state machine 102A replaces its logical clock value with the logical clock value included in state update message 1008C incremented by the first amount. For example, as shown in FIG. 10, primary state machine 102A replaces its logical clock value with a value of 1 and increments its updated logical clock by one from 1 to 2. Primary state machine 102A then sends a message 1008D to client 110 acknowledging completion of the state update operation associated with state update message 1008A. As shown in FIG. 10, primary state machine 102A includes its clock value of 12:00:00.0000 and its logical clock value of 2 in state update message 1008D. Client 110 retains the wall clock value of 12:00:00.0000 and the logical clock value of 2.

As further demonstrated in in FIG. 10, at some point after receiving message 1008D, client 110 sends a read request 1008E to secondary state machine 202B of replicated state machine set 202. As shown in FIG. 10, client 110 includes its wall clock value of 12:00:00.0000 and its logical clock value of 2 in read request 1008E. After receiving read request 1008E, state machine 202B compares the wall clock value at state machine 202B to the wall clock value included in read request 1008E. For instance, after determining that the wall clock value included in read request 1008E is equal to the wall clock value for secondary state machine 202A (as both wall clock values are 12:00:00.0000), secondary state machine 202B compares the logical clock value included read request 1008E to its logical clock value. Because the logical clock value included in read request 1008E (a value of 2) is greater than the logical clock value (a value of 1) for secondary state machine 202B, secondary state machine 202B cannot service read request 1008E.

However, instead of redirecting read request to primary state machine 202A, state machine 202B may need to only wait a limited amount of time before being able to service read request 1008E because primary state machine 202A automatically advances its wall clock value to its local wall clock value and resets its logical clock value to a predetermined starting value in response to a passage of an amount of time. To illustrate, as shown in FIG. 10, in response to a heartbeat decree, the clock value of primary state machine 202A is advanced to its local wall clock value with the passage of every 2 milliseconds. The current 2 millisecond period ends at 12:00:00.0020, at which time primary state machine 202A automatically advances its own wall clock value from 12:00:00.0000 to its local wall clock value of 12:00:00.0020 and resets its logical clock value from 1 to 0. In accordance with this example, primary state machine 202A would advance its own wall clock value to its local wall clock value at 12:00:00.020, 12:00:00.0040, 12:00:00.0060, and so forth. State machine 202A may propagate its updated wall clock value to secondary state machines 202B and 202N. When state machine 202B updates its wall clock value to 12:00:00.0020 and resets its logical clock value to zero, state machine 202B can service read request 608E because the wall clock value included in read request 1008E is less than the wall clock value the secondary state machine 202B.

By periodically updating a wall clock value of a replicated state machine set in this manner, less active replicated state machine sets may advance the values of their wall clock values at a similar rate of more active state machines, thereby allowing secondary state machines of less active replicated state machine sets to satisfy distributed read requests.

Figure 11:
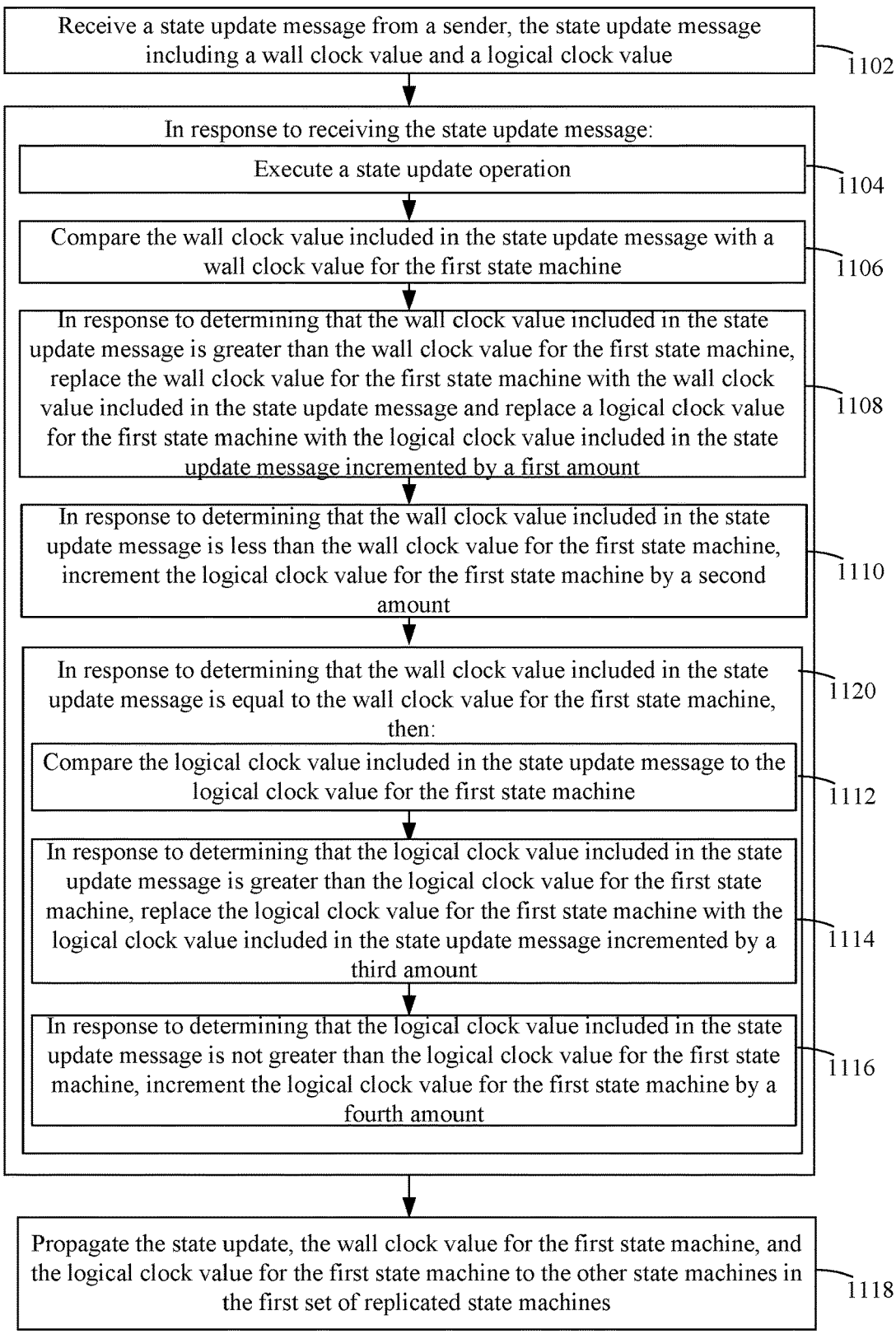
FIG. 11 depicts a flowchart of a method for receiving a state update message and updating a wall clock value and a logical clock value for a first state machine, according to an example embodiment.

System 1000 may operate in various ways to perform its functions. For instance, FIG. 11 depicts a flowchart 1100 of a method for receiving a state update message and updating a wall clock value and a logical clock value for a first state machine, according to an example embodiment. FIG. 11 is described with continued reference to FIG. 10. However, other structural and operational embodiments will be apparent to persons skilled in the relevant art(s) based on the following discussion regarding flowchart 1100 and system 1000 of FIG. 10.

As shown in FIG. 11, flowchart 1100 begins at step 1102. In step 1102, a state update message from a sender is received, wherein the state update message includes a wall clock value and a logical clock value. For example, and with continued reference to FIG. 10, primary state machine 202A receives state update message 1008B from primary state machine 102A including a wall clock value 12:00:00.0000 and a logical clock value of 0. In another embodiment, a state machine may receive a state update message from a client. For example, and with continued reference to FIG. 10, primary state machine 102A receives state update message 1008A from client 110.

In response to receiving the state update message, steps 1104 and 1106 are performed, and depending upon the results of a comparison carried out in step 1106, one of steps 1108, 1110 and 1120 is performed. At step 1104, a state update operation is executed. At step 1106, the wall clock value included in the state update message is compared with a wall clock value for the first state machine. For example, and with continued reference to FIG. 10, after receiving state update message 1008B, primary state machine 202A executes the state update associated with state update message 1008B and compares the wall clock value included in state update message 1008B to its wall clock value to determine that the wall clock value included in state update message 1008B is equal to the wall clock value for primary state machine 202A (as both wall clock values are 12:00:00.0000).

In step 1108, in response to determining that the wall clock value included in the state update message is greater than the wall clock value for the first state machine, the wall clock value for the first state machine is replaced with the wall clock value included in the state update message and a logical clock value for the first state machine is replaced with the logical clock value included in the state update message incremented by a first amount. For example, and with continued reference to FIG. 10, assuming for the sake of illustration that the wall clock value included in message 1008B is greater than the wall clock value for state machine 202A (i.e., greater than 12:00:00.0000), state machine 202A replaces its wall clock value by updating its wall clock value of 12:00:00.0000 to the higher wall clock value included in message 1008B and replaces its logical clock value of 1 by updating its logical clock value with the logical clock value included in state update message 1008B incremented by a first amount (e.g., by an amount of 1).

In step 1110, in response to determining that the wall clock value included in the state update message is less than the wall clock value for the first state machine, the logical clock value for the first state machine is incremented by a second amount. For example, and with continued reference to FIG. 10, assuming for the sake of illustration that the wall clock value included in message 1008B is less than the wall clock value for state machine 202A (i.e., less than 12:00:00.0000), state machine 202A increments its logical clock value by one from 0 to 1.

In step 1120, in response to determining that the wall clock value included in the state update message is equal to the wall clock value for the first state machine, step 1112 is performed, and based on the results of a comparison carried out in that step, one of steps 1114 and 1116 is performed. At step 1112, the logical clock value included in the state update message is compared to the logical clock value for the first state machine. For example, and with continued reference to FIG. 10, after determining that the wall clock value included in state update message 1008B is equal to the wall clock value for primary state machine 202A (as both wall clock values are 12:00:00.0000), primary state machine 202A compares the logical clock value included state update message 1008B to the logical clock value for state machine 202A.

In step 1114, in response to determining that the logical clock value included in the state update message is greater than the logical clock value for the first state machine, the logical clock value for the first state machine is replaced with the logical clock value included in the state update message incremented by a third amount. For example, and with continued reference to FIG. 10, assuming for the sake of illustration that the logical clock value included in message 1008B is greater than the logical clock value for primary state machine 202A (i.e., greater than 0), primary state machine 202A replaces its logical clock value of 0 with the logical clock value included in state update message 1008B incremented by the third amount. To illustrate, if the wall clock value and the logical clock value in message 1008B are <12:00:00.0000, 1> and the wall clock value and the logical clock value for state machine 202A are <12:00:00.0000, 0>, state machine 202 may update its logical clock value with 2 (incrementing the logical clock value of state update message 1008B of 1 by an amount of one), thereby updating its vector values to <12:00:00.0000, 2>.

In step 1116, in response to determining that the logical clock value included in the state update message is not greater than the logical clock value for the first state machine, the logical value for the first state machine is incremented by a fourth amount. For example, and with continued reference to FIG. 10, as shown in FIG. 10, the logical clock value included in state update message 1008B is not greater than the logical clock value for the primary state machine 202A (as both logical clock values are 0), primary state machine 202A increments its logical value by the fourth amount. As shown in FIG. 10, primary state machine 202A increments its logical clock value by one from 0 to 1.

In step 1118, the state update, the wall clock value for the first state machine, and the logical clock value for the first state machine are propagated to the other state machines in the first set of replicated state machines. For example, and with continued reference to FIG. 10, state machine 202A may propagate a state update operation associated with message 1008B, its wall clock value of 12:00:00.0000, and updated logical clock value of 2 to state machines 202B and 202N.

Another example of how system 1000 may operate to perform its functions is depicted in FIG. 12. For instance, FIG. 12 depicts a flowchart 1200 of a method for advancing a wall clock value and resetting a logical clock value for a first state machine and propagating the wall clock value and the logical clock value for the first state machine to other state machines, according to an example embodiment. FIG. 12 is described with continued reference to FIG. 10. However, other structural and operational embodiments will be apparent to persons skilled in the relevant art(s) based on the following discussion regarding flowchart 1200 and system 1000 of FIG. 10.

As shown in FIG. 12, flowchart 1200 begins at step 1202. In step 1202, in response to a passage of an amount of time, the wall clock value for the first state machine is advanced to the current local wall clock value for the first state machine and the logical clock value for the first state machine is reset to a predetermined starting value. For example, and with continued reference to FIG. 10, in response to a heartbeat decree, the wall clock value of primary state machine 202A is advanced to its local wall clock value with the passage of every 2 milliseconds. The current 2 millisecond period ends at 12:00:00.0020, at which time primary state machine 202A automatically advances its own clock value from 12:00:00.0000 to its local wall clock value of 12:00:00.0020 and resets its logical clock value from 1 to 0. In accordance with this example, primary state machine 202A would advance its own wall clock value to its local wall clock value at 12:00:00.020, 12:00:00.0040, 12:00:00.0060, and so forth.

In step 1204, further in response to the passage of the amount of time, the wall clock value for the first state machine and the logical clock value for the first state machine are propagated to the other state machines in the first set of replicated state machines. For example, and with continued reference to FIG. 10, after the clock value for state machine 202A is advanced by the amount of time of 2 milliseconds, state machine 202A may propagate its updated wall clock value and its reset logical clock value to secondary state machines 202B and 202N.

Yet another example of how system 1000 may operate to perform its functions is depicted in FIG. 13. For instance, FIG. 13 depicts a flowchart 1300 of a method for determining whether a secondary state machine can service a read request, according to an example embodiment. FIG. 13 is described with continued reference to FIG. 10. However, other structural and operational embodiments will be apparent to persons skilled in the relevant art(s) based on the following discussion regarding flowchart 1300 and system 1000 of FIG. 10.

As shown in FIG. 13, flowchart 1300 begins at step 1302. In step 1302, a read request that includes a wall clock value and a logical clock value is received. For example, and with continued reference to FIG. 10, state machine 202B receives read request 1008E from client 110.

In response to receiving a read request, step 1304 is performed and, based on the results of the comparison conducted during that step, one of steps 1306, 1308 and 1320 is performed. At step 1304, the wall clock value included in the read request is compared to a wall clock value for the second state machine. For example, and with continued reference to FIG. 10, after receiving read request 1008E, secondary state machine 202B may compare a wall clock value at secondary state machine 202B to a wall clock value included in read request 1008E. As shown in FIG. 10, client 110 includes its clock value of 12:00:00.0000 and its logical clock value of 2 in read request 1008E. After receiving read request 1008E, state machine 202B compares the wall clock value at state machine 202B to the wall clock value included in read request 1008E.

In step 1306, in response to determining that the wall clock value included in the read request is less than the wall clock value for the second state machine, the read request is serviced by performing a state read operation and returning the results of the state read operation to a sender of the read request. For example, and with continued reference to FIG. 10, in response to a heartbeat decree, primary state machine 202A automatically advances its own wall clock value from 12:00:00.0000 to its local wall clock value of 12:00:00.0020 and resets its logical clock value from 1 to 0. Afterwards, state machine 202A may propagate its updated wall clock value and its updated logical clock to secondary state machine 202B. As such, once state machine 202B updates its wall clock value to 12:00:00.0020 and resets its logical clock value to zero, state machine 202B may service read request 1008E and return the results of the state read operation to client 110.

In step 1308, in response to determining that the wall clock value included in the read request is greater than the wall clock value for the second state machine, the read request is not serviced or servicing of the read request is deferred. For example, with continued reference to FIG. 10, assuming for the sake of illustration that the wall clock value included in read request 1008E is greater than the wall clock value for secondary state machine 202B (i.e., greater than 12:00:00.0000), state machine 202B does not service read request 1008E or defers servicing read request 1008E.

At step 1320, in response to determining that the wall clock value included in the read request is equal to the wall clock value for the second state machine, step 1310 is performed, and based on the results of a comparison carried out in step 1310, one of steps 1312 and 1314 is performed. At step 1310, the logical clock value included in the read request is compared to the logical clock value for the second state machine. For example, and with continued reference to FIG. 10, after determining that the wall clock value included in read request 1008E is equal to the wall clock value for secondary state machine 202A (as both wall clock values are 12:00:00.0000), secondary state machine 202B compares the logical clock value included read request 1008E to its logical clock value.

At step 1312, in response to determining that the logical clock value included in the read request is less than or equal to the logical clock value for the second state machine, the read request is serviced by performing the state read operation and returning the results of the state read operation to the sender of the read request. For example, and with continued reference to FIG. 10, assuming for the sake of illustration the logical clock value included in the read request is less than or equal to the logical clock value for the second state machine (i.e., less than or equal to a value of 1), secondary state machine 202B may service read request 1008E by performing the state read operation and returning the results of the state read operation to client 110.

At step 1314, in response to determining that the logical clock value included in the read request is greater than the logical clock value for the second state machine, the read request is not serviced or servicing of the read request is deferred. For example, with continued reference to FIG. 10, because the logical clock value included in read request 1008E (a value of 2) is greater than the logical clock value (a value of 1) for secondary state machine 202B, secondary state machine 202B cannot service read request 1008E.

III. Example Computer System Implementations

Any of the components of systems 600 and 1000 and any of the steps of the flowcharts of FIGS. 7-9 and 11-13 may be implemented in hardware, or hardware with any combination of software and/or firmware, including being implemented as computer program code configured to be executed in one or more processors and stored in a computer readable storage medium, or being implemented as hardware logic/electrical circuitry, such as being implemented in a system-on-chip (SoC). The SoC may include an integrated circuit chip that includes one or more of a processor (e.g., a microcontroller, microprocessor, digital signal processor (DSP), etc.), memory, one or more communication interfaces, and/or further circuits and/or embedded firmware to perform its functions.

Figure 14:
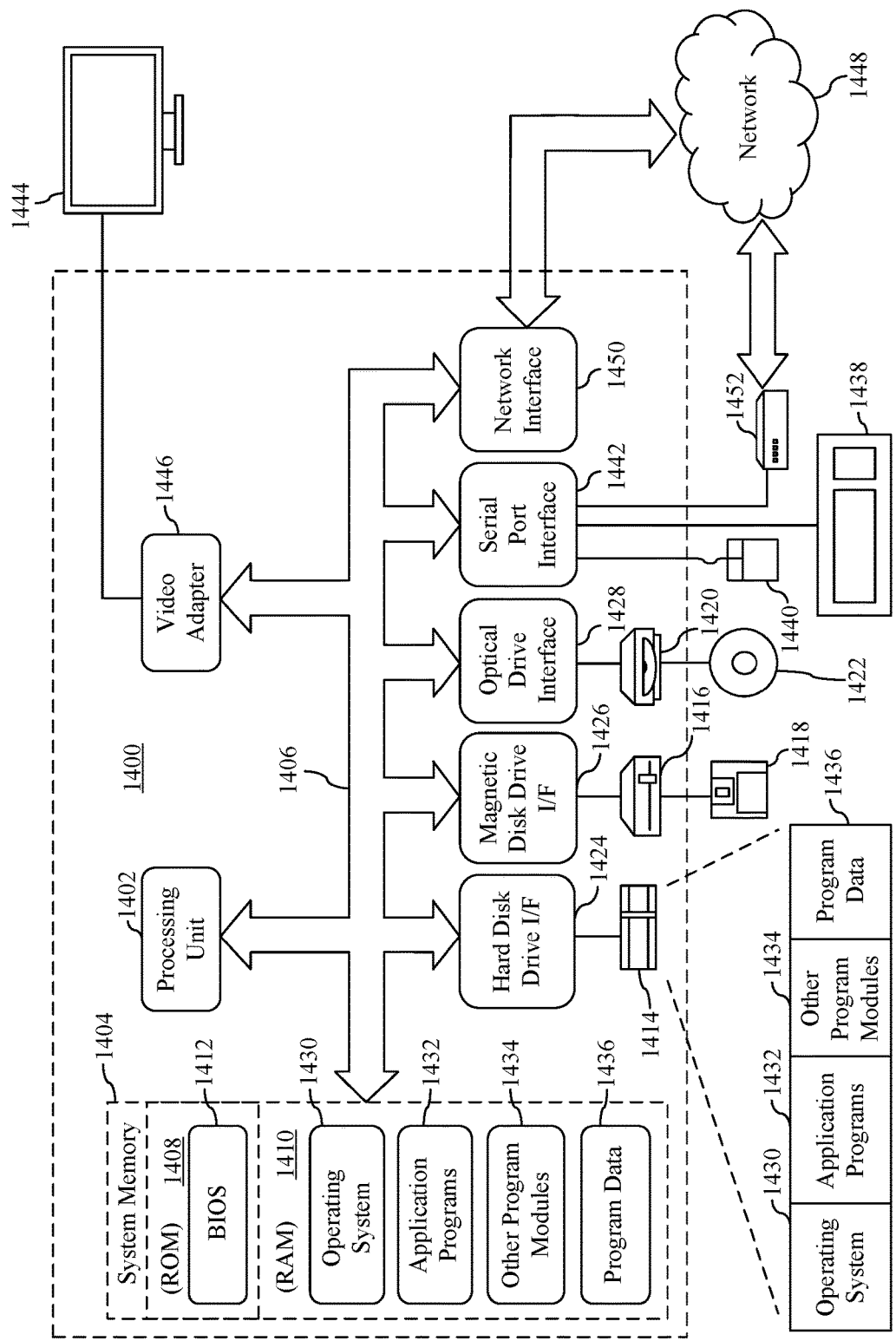
FIG. 14 is a block diagram of an example processor-based computer system that may be used to implement various embodiments.

FIG. 14 depicts an example processor-based computer system 1400 that may be used to implement various embodiments described herein, such as any of the embodiments described in the Sections above and in reference to FIGS. 1-13. For example, processor-based computer system 1400 may be used to implement any of the components of systems 600 and 1000, as described above in reference to FIGS. 6 and 10 as well as any of the flowcharts described above in reference to FIGS. 7-9 and 11-13. The description of system 1400 provided herein is provided for purposes of illustration, and is not intended to be limiting. Embodiments may be implemented in further types of computer systems, as would be known to persons skilled in the relevant art(s).

As shown in FIG. 14, system 1400 includes a processing unit 1402, a system memory 1404, and a bus 1406 that couples various system components including system memory 1404 to processing unit 1402. Processing unit 1402 may comprise one or more hardware-implemented microprocessors or microprocessor cores. Bus 1406 represents one or more of any of several types of bus structures, including a memory bus or memory controller, a peripheral bus, an accelerated graphics port, and a processor or local bus using any of a variety of bus architectures. System memory 1404 includes read only memory (ROM) 1408 and random access memory (RAM) 1410. A basic input/output system 1412 (BIOS) is stored in ROM 1408.

System 1400 also has one or more of the following drives: a hard disk drive 1414 for reading from and writing to a hard disk, a magnetic disk drive 1416 for reading from or writing to a removable magnetic disk 1418, and an optical disk drive 1420 for reading from or writing to a removable optical disk 1422 such as a CD ROM, DVD ROM, BLU-RAY™ disk or other optical media. Hard disk drive 1414, magnetic disk drive 1416, and optical disk drive 1420 are connected to bus 1406 by a hard disk drive interface 1424, a magnetic disk drive interface 1426, and an optical drive interface 1414, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as solid state drives (SSDs), flash memory cards, digital video disks, random access memories (RAMs), read only memories (ROM), and the like.

A number of program modules may be stored on the hard disk, magnetic disk, optical disk, ROM, or RAM. These program modules include an operating system 1430, one or more application programs 1432, other program modules 1434, and program data 1436. In accordance with various embodiments, the program modules may include computer program logic that is executable by processing unit 1402 to implement any of the embodiments described in the Sections above and in reference to FIGS. 1-13. For example, the program modules may include computer program logic that is executable by processing unit 1402 to implement any of the components of systems 600 and 1000 as described above in reference to FIGS. 6 and 10 as well as any of the flowcharts described above in reference to FIGS. 7-9 and 11-13.

A user may enter commands and information into system 1400 through input devices such as a keyboard 1438 and a pointing device 1440 (e.g., a mouse). Other input devices (not shown) may include a microphone, joystick, game controller, scanner, or the like. In one embodiment, a touch screen is provided in conjunction with a display 1444 to allow a user to provide user input via the application of a touch (as by a finger or stylus for example) to one or more points on the touch screen. These and other input devices are often connected to processing unit 1402 through a serial port interface 1442 that is coupled to bus 1406, but may be connected by other interfaces, such as a parallel port, game port, or a universal serial bus (USB). Such interfaces may be wired or wireless interfaces.

Display 1444 is connected to bus 1406 via an interface, such as a video adapter 1446. In addition to display 1444, system 1400 may include other peripheral output devices (not shown) such as speakers and printers.

System 1400 is connected to a network 1448 (e.g., a local area network or wide area network such as the Internet) through a network interface 1450, a modem 1452, or other suitable means for establishing communications over the network. Modem 1452, which may be internal or external, is connected to bus 1406 via serial port interface 1442. System 1400 may include multiple network interfaces.

As used herein, the terms "computer program medium," "computer-readable medium," and "computer-readable storage medium" are used to generally refer to memory devices or storage structures such as the hard disk associated with hard disk drive 1414, removable magnetic disk 1418, removable optical disk 1422, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media As noted above, computer programs and modules (including application programs 1432 and other program modules 1434) may be stored on the hard disk, magnetic disk, optical disk, ROM, or RAM. Such computer programs may also be received via network interface 1450, serial port interface 1442, or any other interface type. Such computer programs, when executed or loaded by an application, enable system 1400 to implement features of embodiments discussed herein. Accordingly, such computer programs represent controllers of the system 1400.

Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

IV. Additional Example Embodiments

In an embodiment, a system comprises a first set of replicated state machines, the first set of replicated state machines comprising: a first state machine, the first state machine being configured to: receive a state update message, the state update message including a clock value; in response to receiving the state update message: execute a state update operation; compare the following values to determine a maximum value thereof: the clock value included in the state update message incremented by a first amount, a clock value for the first state machine incremented by a second amount, and a current local wall clock value for the first state machine; assign the maximum value as the clock value for the first state machine; propagate the state update and the clock value for the first state machine to the other state machines in the first set of replicated state machines; and transmit the clock value for the first state machine to a sender of the state update message; and in response to a passage of an amount of time: advance the clock value for the first state machine to the current local wall clock value for the first state machine; and propagate the clock value for the first state machine to the other state machines in the first set of replicated state machines.

In an embodiment of the foregoing system, the sender comprises a second set of replicated machines or a client computing device.

In an embodiment of the foregoing system, a second state machine within the first set of replicated state machines is configured to: receive a read request, the read request including a clock value; and in response to receiving the read request: compare the clock value included in the read request to a clock value for the second state machine; in response to determining that the clock value included in the read request is less than or equal to the clock value for the second state machine, service the read request by performing a state read operation and returning the results of the state read operation to a sender of the read request; and in response to determining that the clock value included in the read request is greater than the clock value for the second state machine, not service the read request or defer servicing of the read request.

In an embodiment of the foregoing system, the second state machine is configured to, in response to determining that the clock value included in the read request is greater than the clock value for the second state machine, not service the read request and forward the read request to the first state machine.

In an embodiment of the foregoing system, the second state machine is configured to, in response to determining that the clock value included in the read request is greater than the clock value for the second state machine, not service the read request until a new clock value for the second state machine is received from the first state machine that is greater than or equal to the clock value included in the read request.

In an embodiment of the foregoing system, the first state machine is configured to advance the clock value for the first state machine to the current local wall clock value for the first state machine in response to the execution of a no-op operation.

In an embodiment of the foregoing system, the first set of replicated state machines comprises a quorum-based configuration and wherein the first state machine comprises a primary state machine within the quorum-based configuration.

In an embodiment of the foregoing system, the first amount and the second amount are the same In another embodiment, a method performed by a first set of replicated state machines, the method comprises: performing by a first state machine within the first set of replicated state machines: receiving a state update message, the state update message including a clock value; in response to receiving the state update message: executing a state update operation; comparing the following values to determine a maximum value thereof: the clock value included in the state update message incremented by a first amount, a clock value for the first state machine incremented by a second amount, and a current local wall clock value for the first state machine; assigning the maximum value as the clock value for the first state machine; propagating the state update and the clock value for the first state machine to the other state machines in the first set of replicated state machines; and transmitting the clock value for the first state machine to a sender of the state update message; and in response to a passage of an amount of time: advancing the clock value for the first state machine to the current local wall clock value for the first state machine; and propagating the clock value for the first state machine to the other state machines in the first set of replicated state machines.

In an embodiment of the foregoing method, further comprises: performing by a second state machine within the first set of replicated state machines: receiving a read request, the read request including a clock value; and in response to receiving the read request: comparing the clock value included in the read request to a clock value for the second state machine; in response to determining that the clock value included in the read request is less than or equal to the clock value for the second state machine, servicing the read request by performing a state read operation and returning the results of the state read operation to a sender of the read request; and in response to determining that the clock value included in the read request is greater than the clock value for the second state machine, not servicing the read request or deferring servicing of the read request.

In an embodiment of the foregoing method, the performing by the second state machine further comprises, in response to determining that the clock value included in the read request is greater than the clock value for the second state machine, not servicing the read request and forwarding the read request to the first state machine.

In an embodiment of the foregoing method, the performing by the second state machine further comprises, in response to determining that the clock value included in the read request is greater than the clock value for the second state machine, not servicing the read request until a new clock value for the second state machine is received from the first state machine that is greater than or equal to the clock value included in the read request.

In an embodiment of the foregoing method, advancing the clock value for the first state machine to the current local wall clock value for the first state machine comprises: advancing the clock value for the first state machine to the current local wall clock value for the first state machine in response to the execution of a no-op operation.

In an embodiment of the foregoing method, the first set of replicated state machines comprises a quorum-based configuration and wherein the first state machine comprises a primary state machine within the quorum-based configuration.

In an embodiment of the foregoing method, the sender comprises a second set of replicated machines or a client computing device.

In another embodiment, a method performed by a first set of replicated state machines, the method comprises: performing by a first state machine within the first set of replicated state machines: receiving a state update message from a sender, the state update message including a wall clock value and a logical clock value; in response to receiving the state update message: executing a state update; comparing the wall clock value included in the state update message with a wall clock value for the first state machine; in response to determining that the wall clock value included in the state update message is greater than the wall clock value for the first state machine, replacing the wall clock value for the first state machine with the wall clock value included in the state update message and replacing a logical clock value for the first state machine with the logical wall clock value included in the state update message incremented by a first amount; in response to determining that the wall clock value included in the state update message is less than the wall clock value for the first state machine, incrementing the logical clock value for the first state machine by a second amount; and in response to determining that the wall clock value included in the state update message is equal to the wall clock value for the first state machine, then: comparing the logical clock value included in the state update message to the logical clock value for the first state machine; in response to determining that the logical clock value included in the state update message is greater than the logical clock value for the first state machine, replacing the logical clock value for the first state machine with the logical clock value included in the state update message incremented by a third amount; and in response to determining that the logical clock value included in the state update message is not greater than the logical clock value for the first state machine, incrementing the logical value for the first state machine by a fourth amount; and propagating the state update and the wall clock value for the first state machine and the logical clock value for the first state machine to the other state machines in the first set of replicated state machines; and in response to a passage of an amount of time: advancing the wall clock value for the first state machine to the current local wall clock value and resetting the logical clock value for the first state machine to a predetermined starting value; and propagating the wall clock value for the first state machine and the logical clock value for the first state machine to the other state machines in the first set of replicated state machines.

In an embodiment of the foregoing method, further comprises: performing by a second state machine within the first set of replicated state machines: receiving a read request, the read request including a wall clock value and a logical clock value; and in response to receiving the read request: comparing the wall clock value included in the read request to a wall clock value for the second state machine; in response to determining that the wall clock value included in the read request is less than the wall clock value for the second state machine, servicing the read request by performing a state read operation and returning the results of the state read operation to a sender of the read request; in response to determining that the wall clock value included in the read request is greater than the wall clock value for the second state machine, not servicing the read request or deferring servicing of the read request; and in response to determining that the wall clock value included in the read request is equal to the wall clock value for the second state machine: comparing the logical clock value included in the read request to the logical clock value for the second state machine; in response to determining that the logical clock value included in the read request is less than or equal to the logical clock value for the second state machine, servicing the read request by performing the state read operation and returning the results of the state read operation to the sender of the read request; and in response to determining that the logical clock value included in the read request is greater than the logical clock value for the second state machine, not servicing the read request or deferring servicing of the read request.

In an embodiment of the foregoing method, advancing the wall clock value for the first state machine to the current local wall clock value and resetting the logical clock value for the first state machine to the predetermined starting value comprises: advancing the wall clock value for the first state machine to the current local wall clock value and resetting the logical clock value for the first state machine to the predetermined starting value in response to the execution of a no-op operation In an embodiment of the foregoing method, the first set of replicated state machines comprises a quorum-based configuration and wherein the first state machine comprises a primary state machine within the quorum-based configuration.

In an embodiment of the foregoing method, the sender comprises a second set of replicated machines or a client computing device.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system comprising a first set of replicated state machines, the first set of replicated state machines comprising:
    a first state machine, the first state machine being configured to:
        receive a state update message, the state update message including a clock value;
        in response to receiving the state update message:
            execute a state update operation;
            compare the following values to determine a maximum value thereof: the clock value included in the state update message incremented by a first amount a clock value for the first state machine incremented by a second amount, and a current local wall clock value for the first state machine;
            assign the maximum value as the clock value for the first state machine;
            propagate the state update and the clock value for the first state machine to the other state machines in the first set of replicated state machines; and
            transmit the clock value for the first state machine to a sender of the state update message; and
        in response to a passage of an amount of time:
            advance the clock value for the first state machine to the current local wall clock value for the first state machine; and
            propagate the clock value for the first state machine to the other state machines in the first set of replicated state machines.

2. The system of claim 1, wherein the sender comprises a second set of replicated machines or a client computing device.

3. The system of claim 1, wherein a second state machine within the first set of replicated state machines is configured to:
receive a read request, the read request including a clock value; and
in response to receiving the read request:
compare the clock value included in the read request to a clock value for the second state machine;
in response to determining that the clock value included in the read request is less than or equal to the clock value for the second state machine, service the read request by performing a state read operation and returning the results of the state read operation to a sender of the read request; and
in response to determining that the clock value included in the read request is greater than the clock value for the second state machine, not service the read request or defer servicing of the read request.

4. The system of claim 3, wherein the second state machine is configured to, in response to determining that the clock value included in the read request is greater than the clock value for the second state machine, not service the read request and forward the read request to the first state machine.

5. The system of claim 3, wherein the second state machine is configured to, in response to determining that the clock value included in the read request is greater than the clock value for the second state machine, not service the read request until a new clock value for the second state machine is received from the first state machine that is greater than or equal to the clock value included in the read request.

6. The system of claim 1, wherein the first state machine is configured to advance the clock value for the first state machine to the current local wall clock value for the first state machine in response to the execution of a no-op operation.

7. The system of claim 1, wherein the first set of replicated state machines comprises a quorum-based configuration and wherein the first state machine comprises a primary state machine within the quorum-based configuration.

8. The system of claim 1, wherein the first amount and the second amount are the same.

9. A method performed by a first set of replicated state machines, the method comprising:
performing by a first state machine within the first set of replicated state machines:
receiving a state update message, the state update message including a clock value;
in response to receiving the state update message:
executing a state update operation;
comparing the following values to determine a maximum value thereof: the clock value included in the state update message incremented by a first amount, a clock value for the first state machine incremented by a second amount, and a current local wall clock value for the first state machine;
assigning the maximum value as the clock value for the first state machine;
propagating the state update and the clock value for the first state machine to the other state machines in the first set of replicated state machines; and
transmitting the clock value for the first state machine to a sender of the state update message; and
in response to a passage of an amount of time:
advancing the clock value for the first state machine to the current local wall clock value for the first state machine; and
propagating the clock value for the first state machine to the other state machines in the first set of replicated state machines.

10. The method of claim 9, further comprising:
performing by a second state machine within the first set of replicated state machines:
receiving a read request, the read request including a clock value; and
in response to receiving the read request:
comparing the clock value included in the read request to a clock value for the second state machine;
in response to determining that the clock value included in the read request is less than or equal to the clock value for the second state machine, servicing the read request by performing a state read operation and returning the results of the state read operation to a sender of the read request; and
in response to determining that the clock value included in the read request is greater than the clock value for the second state machine, not servicing the read request or deferring servicing of the read request.

11. The method of claim 10, wherein the performing by the second state machine further comprises, in response to determining that the clock value included in the read request is greater than the clock value for the second state machine, not servicing the read request and forwarding the read request to the first state machine.

12. The method of claim 10, wherein the performing by the second state machine further comprises, in response to determining that the clock value included in the read request is greater than the clock value for the second state machine, not servicing the read request until a new clock value for the second state machine is received from the first state machine that is greater than or equal to the clock value included in the read request.

13. The method of claim 9, wherein advancing the clock value for the first state machine to the current local wall clock value for the first state machine comprises:
advancing the clock value for the first state machine to the current local wall clock value for the first state machine in response to the execution of a no-op operation.

14. The method of claim 9, wherein the first set of replicated state machines comprises a quorum-based configuration and wherein the first state machine comprises a primary state machine within the quorum-based configuration.

15. The method of claim 9, wherein the sender comprises a second set of replicated machines or a client computing device.

16. A method performed by a first set of replicated state machines, the method comprising:
performing by a first state machine within the first set of replicated state machines:
receiving a state update message from a sender, the state update message including a wall clock value and a logical clock value;
in response to receiving the state update message:
executing a state update;

comparing the wall clock value included in the state update message with a wall clock value for the first state machine;

in response to determining that the wall clock value included in the state update message is greater than the wall clock value for the first state machine, replacing the wall clock value for the first state machine with the wall clock value included in the state update message and replacing a logical clock value for the first state machine with the logical clock value included in the state update message incremented by a first amount;

in response to determining that the wall clock value included in the state update message is less than the wall clock value for the first state machine, incrementing the logical clock value for the first state machine by a second amount; and in response to determining that the wall clock value included in the state update message is equal to the wall clock value for the first state machine, then:
comparing the logical clock value included in the state update message to the logical clock value for the first state machine;

in response to determining that the logical clock value included in the state update message is greater than the logical clock value for the first state machine, replacing the logical clock value for the first state machine with the logical clock value included in the state update message incremented by a third amount; and in response to determining that the logical clock value included in the state update message is not greater than the logical clock value for the first state machine, incrementing the logical clock value for the first state machine by a fourth amount; and propagating the state update and the wall clock value for the first state machine and the logical clock value for the first state machine to the other state machines in the first set of replicated state machines; and in response to a passage of an amount of time:
advancing the wall clock value for the first state machine to the current local wall clock value and resetting the logical clock value for the first state machine to a predetermined starting value; and propagating the wall clock value for the first state machine and the logical clock value for the first state machine to the other state machines in the first set of replicated state machines.

17. The method of claim 16, further comprising:
performing by a second state machine within the first set of replicated state machines:
receiving a read request, the read request including a wall clock value and a logical clock value; and in response to receiving the read request:
comparing the wall clock value included in the read request to a wall clock value for the second state machine;

in response to determining that the wall clock value included in the read request is less than the wall clock value for the second state machine, servicing the read request by performing a state read operation and returning the results of the state read operation to a sender of the read request;

in response to determining that the wall clock value included in the read request is greater than the wall clock value for the second state machine, not servicing the read request or deferring servicing of the read request; and in response to determining that the wall clock value included in the read request is equal to the wall clock value for the second state machine:
comparing the logical clock value included in the read request to the logical clock value for the second state machine;

in response to determining that the logical clock value included in the read request is less than or equal to the logical clock value for the second state machine, servicing the read request by performing the state read operation and returning the results of the state read operation to the sender of the read request; and in response to determining that the logical clock value included in the read request is greater than the logical clock value for the second state machine, not servicing the read request or deferring servicing of the read request.

18. The method of claim 16, wherein advancing the wall clock value for the first state machine to the current local wall clock value and resetting the logical clock value for the first state machine to the predetermined starting value comprises:
advancing the wall clock value for the first state machine to the current local wall clock value and resetting the logical clock value for the first state machine to the predetermined starting value in response to the execution of a no-op operation.

19. The method of claim 16, wherein the first set of replicated state machines comprises a quorum-based configuration and wherein the first state machine comprises a primary state machine within the quorum-based configuration.

20. The method of claim 16, wherein the sender comprises a second set of replicated machines or a client computing device.

* * * * *